United States Patent
Borthakur et al.

(10) Patent No.: US 10,620,930 B2
(45) Date of Patent: *Apr. 14, 2020

(54) SOFTWARE ASSET MANAGEMENT

(71) Applicant: ServiceNow, Inc., Santa Clara, CA (US)

(72) Inventors: Apolak Borthakur, Palo Alto, CA (US); Manish Srivastava, Cary, NC (US); Yu Xia, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/588,126

(22) Filed: May 5, 2017

(65) Prior Publication Data

US 2018/0321927 A1 Nov. 8, 2018

(51) Int. Cl.
*G06F 9/445* (2018.01)
*G06F 8/61* (2018.01)
*H04L 29/08* (2006.01)
*G06F 9/50* (2006.01)
*G06F 21/10* (2013.01)
*H04L 12/24* (2006.01)

(52) U.S. Cl.
CPC ............ *G06F 8/61* (2013.01); *G06F 8/62* (2013.01); *G06F 9/5061* (2013.01); *G06F 21/105* (2013.01); *H04L 67/34* (2013.01); *G06F 2209/508* (2013.01); *H04L 41/0266* (2013.01); *H04L 41/20* (2013.01)

(58) Field of Classification Search
CPC .............................................. G06F 8/61–8/62
USPC ....................................................... 717/177
See application file for complete search history.

(56) References Cited

U.S. PATENT DOCUMENTS

| | | | |
|---|---|---|---|
| 6,502,124 B1 | 12/2002 | Shimakawa et al. | |
| 7,350,186 B2 | 3/2008 | Coleman | |
| 7,409,463 B2 * | 8/2008 | Ramachandran | G06F 8/61 707/999.004 |
| 7,647,622 B1 * | 1/2010 | Sobel | H04L 63/1425 709/229 |
| 7,802,197 B2 | 9/2010 | Lew | |

(Continued)

FOREIGN PATENT DOCUMENTS

| | | |
|---|---|---|
| EP | 3002699 A1 | 4/2016 |
| WO | 2001095139 A1 | 12/2001 |
| WO | 2013188364 A1 | 12/2013 |

OTHER PUBLICATIONS

Australian Office Action for Australian Patent Application No. 2018200022 dated Oct. 26, 2018; 6 pgs.

(Continued)

*Primary Examiner* — Francisco J Aponte
(74) *Attorney, Agent, or Firm* — Fletcher Yoder PC

(57) ABSTRACT

Systems and methods are disclosed for provisioning software in computing networks. For example, methods may include invoking one or more discovery probes; retrieving software usage data based at least on the one or more discovery probes; determining software usage predictions based on the software usage data; allocating, based on the software usage predictions, per user software entitlements and per device software entitlements to obtain an allocation of software entitlements; and invoking installation or uninstallation of software responsive to the allocation of software entitlements.

11 Claims, 14 Drawing Sheets

(56) References Cited

U.S. PATENT DOCUMENTS

| | | | |
|---|---|---|---|
| 7,831,457 B2 | 11/2010 | Varadarajan | |
| 7,890,950 B1 | 2/2011 | Nanavati et al. | |
| 8,370,947 B2* | 2/2013 | Zaitsev | G06F 21/552 |
| | | | 713/152 |
| 8,548,790 B2 | 10/2013 | Tylutki | |
| 8,997,051 B2 | 3/2015 | Robertson | |
| 9,065,660 B2 | 6/2015 | Ellis | |
| 9,141,908 B1 | 9/2015 | Reiner | |
| 9,165,332 B2* | 10/2015 | Li | G06F 21/105 |
| 9,230,068 B2* | 1/2016 | Hess | G06F 21/10 |
| 9,245,096 B2 | 1/2016 | Abuelsaad | |
| 9,270,624 B2 | 2/2016 | Zhuang | |
| 9,286,445 B2 | 3/2016 | Cox | |
| 9,424,401 B2 | 8/2016 | Didcock | |
| 9,430,653 B2 | 8/2016 | Christodorescu | |
| 9,467,466 B2 | 10/2016 | Mankovskii | |
| 9,563,751 B1* | 2/2017 | Dickson | H04L 67/34 |
| 9,710,864 B2* | 7/2017 | Didcock | G06F 21/105 |
| 9,749,209 B2 | 8/2017 | Cimino | |
| 9,860,303 B1 | 1/2018 | Vicaire | |
| 9,870,260 B2 | 1/2018 | Cao | |
| 9,870,261 B2* | 1/2018 | Cao | G06F 9/5011 |
| 9,916,429 B2* | 3/2018 | Hess | G06F 21/10 |
| 9,928,349 B2 | 3/2018 | Bantz | |
| 9,953,282 B2 | 4/2018 | Shaouy | |
| 10,075,346 B2* | 9/2018 | Malecki | H04L 41/20 |
| 10,162,713 B2* | 12/2018 | Taylor | G06F 11/1469 |
| 10,389,760 B2* | 8/2019 | Bryson | H04L 63/205 |
| 2004/0225524 A1* | 11/2004 | Narasimhan | G06F 21/10 |
| | | | 705/59 |
| 2005/0049973 A1 | 3/2005 | Read | |
| 2006/0265324 A1* | 11/2006 | Leclerc | G06F 21/577 |
| | | | 705/38 |
| 2008/0189788 A1* | 8/2008 | Bahl | G06F 21/577 |
| | | | 726/25 |
| 2008/0301672 A1* | 12/2008 | Rao | G06F 8/61 |
| | | | 717/177 |
| 2009/0119779 A1* | 5/2009 | Dean | G06F 21/105 |
| | | | 726/26 |
| 2010/0125911 A1* | 5/2010 | Bhaskaran | G06Q 10/10 |
| | | | 726/23 |
| 2011/0054846 A1 | 3/2011 | Karayi | |
| 2011/0131315 A1* | 6/2011 | Ferris | G06Q 30/0601 |
| | | | 709/224 |
| 2013/0054492 A1 | 2/2013 | Boudreau et al. | |
| 2013/0185433 A1 | 7/2013 | Zhu | |
| 2013/0191923 A1 | 7/2013 | Abuelsaad et al. | |
| 2013/0339284 A1 | 12/2013 | Rowles et al. | |
| 2014/0052610 A1 | 2/2014 | Aggarwal et al. | |
| 2015/0007180 A1 | 1/2015 | Sharp | |
| 2016/0011861 A1 | 1/2016 | Barthel | |
| 2016/0085574 A1 | 3/2016 | Dornemann | |
| 2016/0085636 A1 | 3/2016 | Dornemann | |
| 2016/0094410 A1 | 3/2016 | Anwar | |
| 2017/0213155 A1 | 7/2017 | Hammond | |
| 2017/0214632 A1 | 7/2017 | Ravi | |
| 2017/0270450 A1 | 9/2017 | Binotto | |
| 2018/0097744 A1 | 4/2018 | Hu | |
| 2018/0120813 A1 | 5/2018 | Coffman | |
| 2018/0205666 A1 | 11/2018 | Nash | |

OTHER PUBLICATIONS

Extended European Search Report for European Application No. 17210991.0 dated Jun. 21, 2018; 7 pgs.

* cited by examiner

SOFTWARE ASSET MANAGEMENT

BACKGROUND

Computing networks can be large and complex, consisting of many thousands of hardware and software components. Maintaining and operating a large network can present many challenges. One challenge is keeping track of what computing resources are installed in the computing network. Discovery techniques may be employed to gather data about the computing resources installed or operating within a computing network. The data gathered about the computing resources in the network may be stored in a database with records associated with particular computing resources to model the current state or structure of the computing network.

SUMMARY

Disclosed herein are implementations of software asset management.

In an implementation, a system is provided operable to provision software in computing networks. The system may include a memory and a processor. The memory includes instructions executable by the processor to cause the system to invoke one or more discovery probes; retrieve software usage data based at least on the one or more discovery probes; determine software usage predictions based on the software usage data; allocate, based on the software usage predictions, per user software entitlements and per device software entitlements to obtain an allocation of software entitlements; and invoke installation or uninstallation of software responsive to the allocation of software entitlements.

In an implementation, a system is provided that includes a plurality of customer platform instances running on one or more server devices, and a central data server instance running on one or more server devices. The central data server instance is configured to process pull requests from the plurality of customer platform instances to provide software model data; and process push requests from the plurality of customer platform instances to receive unrecognized discovery probe data.

In an implementation, a method is provided for provisioning software in computing networks. The method may include invoking one or more discovery probes; retrieving software usage data based at least on the one or more discovery probes; determining software usage predictions based on the software usage data; allocating, based on the software usage predictions, per user software entitlements and per device software entitlements to obtain an allocation of software entitlements; and invoking installation or uninstallation of software responsive to the allocation of software entitlements.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
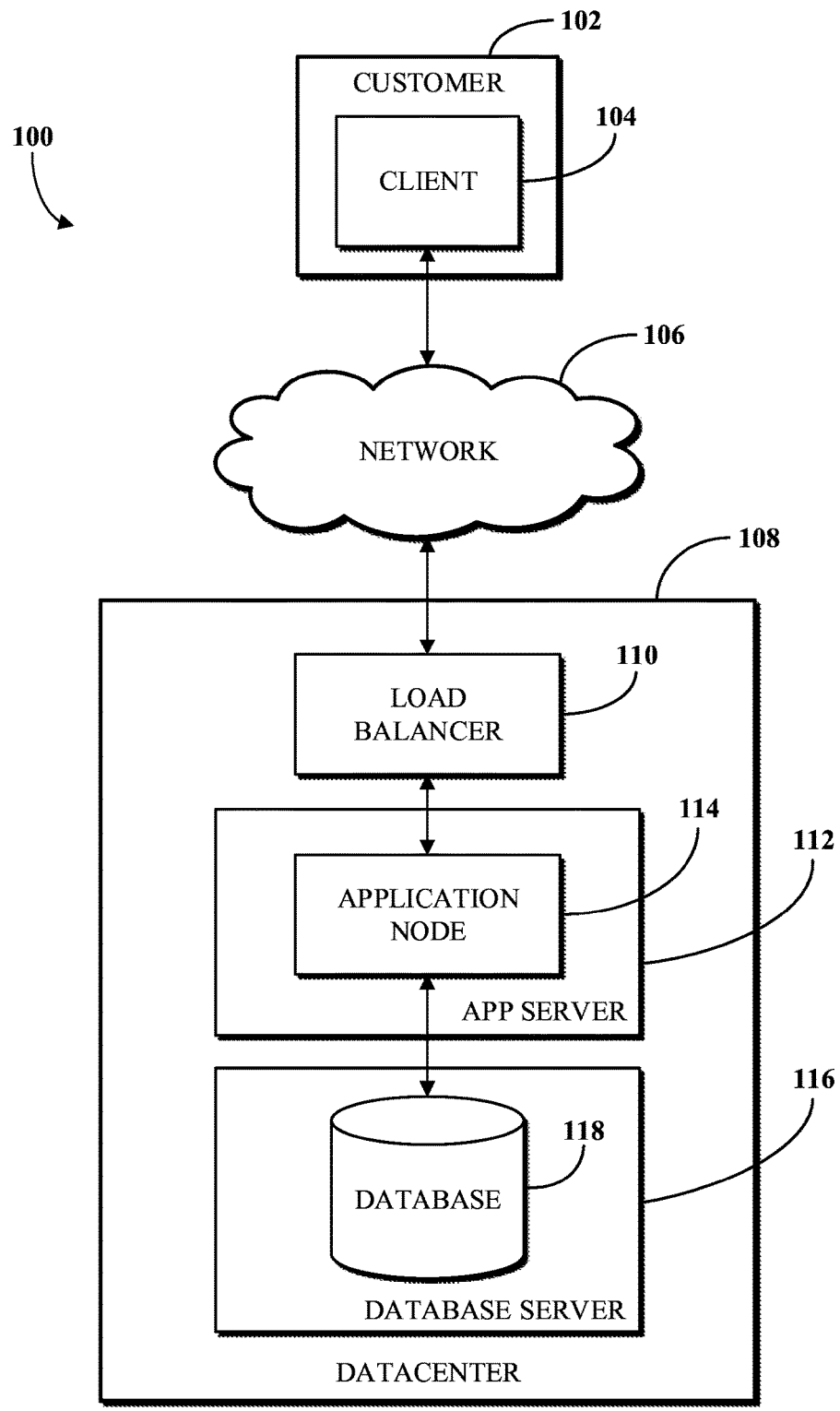
FIG. 1 is a diagram of an example of an electronic computing and communications system.

This document includes disclosure of systems, apparatus, and methods for software asset management in a computing network to facilitate efficient operation of the computing network. For example, discovery techniques may be employed to find computing resources (e.g., hardware components or software components) that are installed or running within a network, such as a large corporate or enterprise network. For example, the network can be probed to find hardware or software components, information about components can be received via user input, or combinations thereof. In practice, a corporate network may be probed to identify the laptops used by the corporation's employees, possibly to automate upgrades to the laptops. In another example, the corporate network may be probed to identify servers, routers, and/or other computers, among other hardware or software components, to deploy patches or updates to various such devices. The results of such discovery techniques may include strings of text or other data that describe a discovered computing resource.

Software components in a computing network may be subject to software entitlements (e.g., software licenses).

The operator of a computing network may be responsible for compliance with software entitlements (e.g., not using more instances of a software product than have been purchased). Keeping track of what how software components are installed and used in a large computing network (e.g., including thousands of computing devices) with evolving software usage patterns is a challenge. This challenge and the complexity of software entitlements, which can take a number of different forms and use different compliance metrics (e.g., per user or per device software entitlements), create challenges and opportunities for optimization in a software asset management system that is implemented to provision software components subject to software entitlements in a large dynamic computing network.

Software, for example, an instance of platform software implemented by a Platform-as-a-Service (PaaS) computing provider, can be used to manage the status and configuration of a computer network. The instance of platform software, for example, may be used to process discovered data, reconcile discovered data with existing data, and manage software component entitlements and/or provisioning. For example, the platform software may include information technology operations management (ITOM) or like tools to manage computerized systems. ITOM tools may include policies, processes, and procedures to design and maintain the computers in a computerized network and associated devices and software for an organization. For example, ITOM tools may keep track of user computers and associated services, software, servers, routers, etc., within an organization so that administrators can determine when users have been added or removed, when equipment has been added, removed, or needs to be upgraded, when software needs to be updated, or the like.

End-to-end discovery of components and reconciliation between discovered data and existing data may be performed for a computing network under management (e.g., using an instance of platform software). For example, discovery probes may be invoked against target computing devices in the computing network and/or to interrogate data sources (e.g., a System Center Configuration Manager (SCCM)) in the computing network storing information about software components installed and/or running in the computing network. The discovery process can be used to collect data describing software installations in the computing network and software usage data for software components running in the computing network. In some implementations, the software usage data is analyzed to determine predictions or estimates of future software usage.

The system may perform software reconciliation to match data discovered regarding installations of software components in the computing network to predicted usage patterns and to software entitlements held for the computing network. For example, a set of available software entitlements may be allocated to cover a set of software installations chosen to meet predicted future software usage patterns while attempting to reduce licensing costs that may be associated with the software entitlements. As a result of an allocation of software entitlements copies of subject software components may be installed or uninstalled on various computing devices and assigned to various users within the computing network. For example, additional software entitlements may be procured to meet expected demand for software usage in the computing network. For example, certain software components may be identified as reclamation candidates if observed or predicted usage does not justify the continued expense of deployment in the computing network.

In some cases, discovered data describing computing resources (e.g., hardware components or software components) in a computing network may not exactly match known descriptions of known software products. Normalization rules may be used to match known variations of known descriptions of known components. In some cases, generic normalization rules may be tried (e.g., assuming that the first word of a string is the publisher of a software application). If existing normalization rules are unable to map a discovered computing resource to a known computing resource, this may be called a normalization miss. Normalization misses can degrade performance by making a variety of operational management functions for the computing network more difficult or impossible to complete, such as software asset management and software entitlement compliance. For example, if the system cannot recognize the software it finds in the computing network, it may be unable to obtain the proper software entitlements for these software components at appropriate levels. Implementations of this disclosure collect data from a number of customer computing networks under management (e.g., regarding normalization misses) and use the data to determine updated normalization rules. Such implementations may be used to mitigate the problem of normalization misses. Such implementations may be particularly useful in quickly evolving computer network environments where components are rapidly changed and updated.

Customer platform instances responsible for managing respective customer computing networks, at the option of the networks' respective operators, push data about normalization misses to a central data serving instance. From there the data regarding normalization misses may be accessed by a software asset management system and used to update a set of normalization rules accordingly. The updated normalization rules may then be pulled from the central data serving instance by the customer platform instances to share the new information and facilitate efficient normalization of discovered computing resources in the respective customer computing networks. In this manner, software asset management and operations of the customer computing networks may be improved.

Implementations of this disclosure provide technological improvements particular to computer networks, for example, the processes for allocation of software entitlements for computing resources occurring in a computing network may be improved. Computer network-specific technological problems, such as mismatch between a set of software entitlements for a computing network and a set of software resources installed and used in the computing network, can be wholly or partially solved by implementations of this disclosure. For example, a technique for automated discovery of software resources in a computing network and reconciliation with a set of software entitlements, including reclamation and/or procurement of software entitlements, may be implemented to facilitate maintenance and operation of computing networks. Implementations of this disclosure can thus introduce new and efficient improvements in the ways in which computing resources (e.g., software components) are deployed by monitoring and predicting usage patterns for computing resources in a computing network and allocating computing resources based on the predicted usage patterns.

To describe some implementations in greater detail, reference is first made to examples of hardware structures. FIG. 1 is a diagram of an example of an electronic computing and communications system 100. As used herein, the term "electronic computing and communications system," or variations thereof, can be, or include, a distributed computing system, such as a client-server computing system, a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit, or as a combination of physical units. In some implementations, a single physical unit can include multiple clients.

The client 104 can be an instance of an application running on a customer device associated with the customer 102. The system 100 can include any number of customers and/or clients and/or can have a configuration of customers and/or clients different from that generally illustrated in FIG. 1. For example, and without limitation, the system 100 can include hundreds or thousands of customers, and at least some of the customers can include and/or be associated with any number of clients. A customer can include a customer network and/or domain. For example, and without limitation, the client 104 can be associated and/or communicate with a customer network and/or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers and/or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated and/or communicate with one or more datacenter networks and/or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, and/or path or using a distinct connection point, link, and/or path. A connection point, link, or path can be wired, wireless, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, and/or any combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals and/or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 and/or the database server 116 can be a computing system, which can include one or more computing devices, such as a desktop computer, a server computer, or any other computer capable of operating as a server. In some implementations, the application server 112 and/or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the current database 118 of the database server 116.

The application server 112 can include any suitable number of application nodes, depending upon a system load and/or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as a current database 118, which can be accessible by an application executed on the application server 112. The current database 118 may be implemented as a relational database management system (RDBMS), an object database, an XML database, a configuration management database (CMDB), a management information base (MIB), one or more flat files, or the like, or a combination thereof. By way of non-limiting example, the system 100, in some implementations, can include an XML database and a CMDB. While limited examples are described, the current database 118 can be configured as and/or comprise any suitable database type. Further, the system 100 can include one, two, three, or any suitable number of databases configured as and/or comprising any suitable database type and/or combination thereof.

In some implementations, the database 118 can be configured as and/or comprise a CMDB. A CMDB can comprise a plurality of configuration items (CIs). A CI can be a CMDB record that represents an infrastructure entity, device, and/or units of the system 100. For example, the customer 102, the client 104, the network 106, the datacenter 108, the load balancer 110, the application server 112, the application node 114, the database server 116, the current database 118, or any other element, portion of an element, or combination of elements of the electronic computing and communications system 100 can be represented in the CMDB by a CI.

The CMDB can include information describing the configuration, the role, or both, of an element of the system 100. In some implementations, an MIB can include one or more databases listing characteristics of the elements of the system 100. In some implementations, an object identifier (OID) can represent object identifiers of objects or elements in the MM.

One or more databases (e.g., the current database 118), tables, other suitable information sources, and/or portions or combinations thereof can be stored, managed, or otherwise provided by one or more of the elements of the system 100 other than the database server 116, such as the client 104 and/or the application server 112.

Some or all of the systems and techniques described herein can operate and/or be executed on or by the servers associated with the system 100. For example, an SCCM (System Center Configuration Manager) database of the customer 102 can be searched for data describing installed and/or running software computing resources in response to a message by a software module executed on the application node 114, and a table installed and/or running software computing resources in the database 118 may be updated based on results of a search received by the application server 112. In some implementations, the systems and methods described herein, portions thereof, or combinations thereof, can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, and/or both can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the current database 118, and the secondary datacenter can include a secondary database. The secondary database can include an exact or substantially exact mirror, copy, or replication of the primary database. The primary database and/or the secondary database can be implemented as a relational database management system (RDBMS), an object database, an XML database, one or more flat files, or the like.

An application node implemented within a distributed computing environment can connect to and/or communicate with the primary database, which can be associated with the datacenter with which the application node is associated, and/or associated with another datacenter. For example, a primary datacenter can include a primary database and a first set of application nodes. A secondary datacenter can include a secondary database and a second set of application nodes. The application nodes of the first and second sets can provide a service or application to remote clients, and can read and/or write data in the primary database. The secondary database can mirror changes made to the primary database and prevent write operations from being performed directly on the secondary database. In the event that a failover condition associated with the primary database is identified, the secondary database can operate as the primary database and can allow read and/or write access to data. The primary database can then operate as the secondary database, mirror the new primary database, and prevent direct write access to the new secondary database.

A distributed computing system can allocate resources of a computer network using a multi-tenant or single-tenant architecture, for example. Allocation of resources in a multi-tenant architecture can include installations and/or instantiations of one or more servers, such as application servers, database servers, and/or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, and/or both can distinguish between and segregate data and/or other information of the various customers using the system.

In a single-tenant infrastructure (which can also be referred to as a multi-instance architecture), separate web servers, application servers, database servers, and/or combinations thereof can be provisioned for at least some customers and/or customer sub-units. Customers and/or customer sub-units can access one or more dedicated web servers, have transactions processed using one or more dedicated application servers, and/or have data stored in one or more dedicated database servers, catalogs, and/or both. Physical hardware servers can be shared such that multiple installations and/or instantiations of web servers, application servers, database servers, and/or combinations thereof can be installed on the same physical server. An installation can be allocated a portion of the physical server resources, such as RAM, storage, communications bandwidth, and/or processor cycles.

A customer instance can include multiple web server instances, multiple application server instances, multiple database server instances, and/or a combination thereof. The server instances can be physically located on different physical servers and can share resources of the different physical servers with other server instances associated with other customer instances. In a distributed computing system, multiple customer instances can be used concurrently. Other configurations and/or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, and/or a combination thereof.

Figure 2:
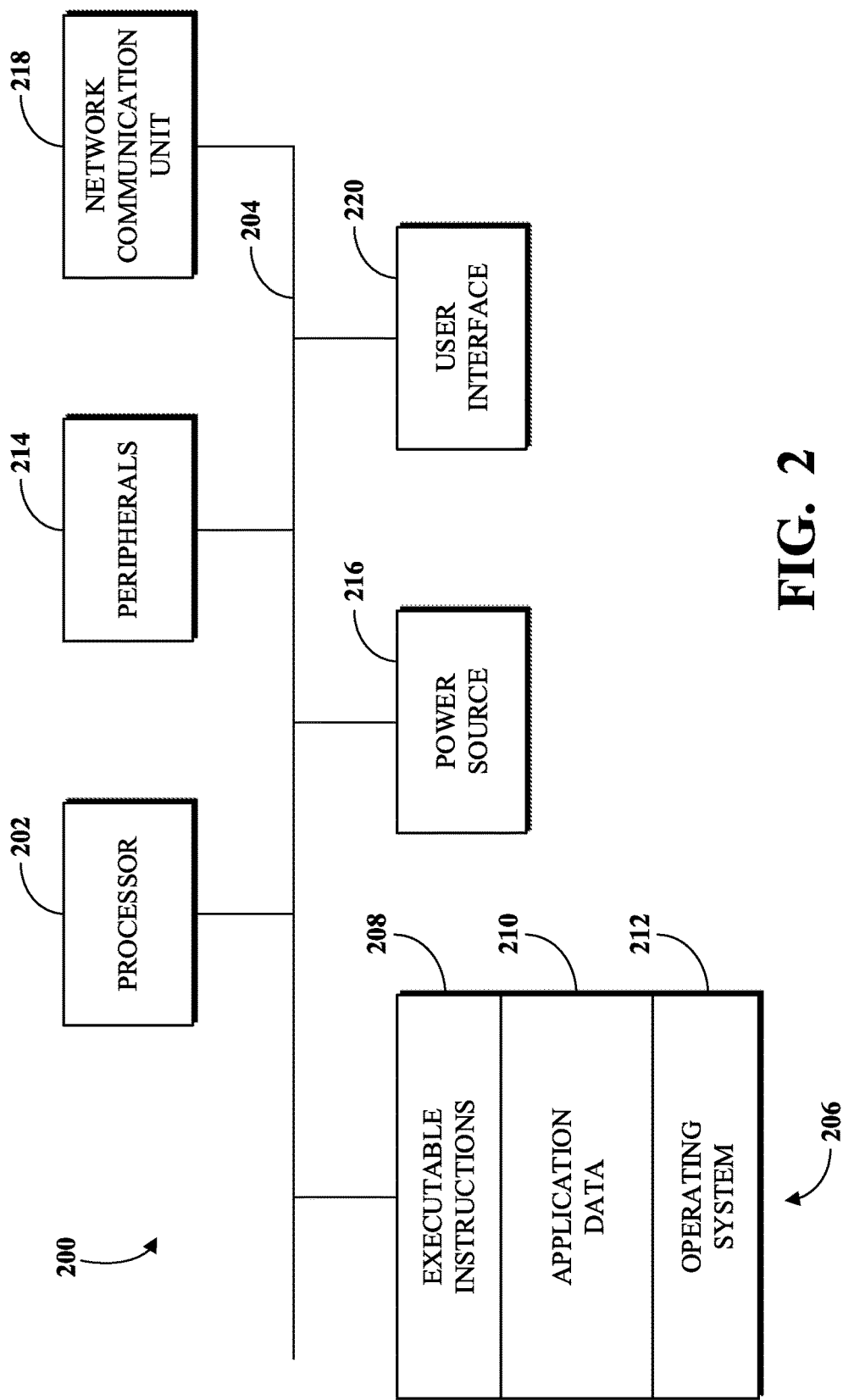
FIG. 2 is a block diagram of an example internal configuration of a computing device of the electronic computing and communications system shown in FIG. 1.

FIG. 2 generally illustrates a block diagram of an example internal configuration of a computing device 200, such as a client 104 and/or a server, such as an application server 112 and/or a database server 116, of the electronic computing and communications system 100 as generally illustrated in FIG. 1. As previously described, a client and/or server can be a computing system including multiple computing devices and/or a single computing device, such as a mobile phone, a tablet computer, a laptop computer, a notebook computer, a desktop computer, a server computer, and/or other suitable computing devices. A computing device 200 can include components and/or units, such as a processor 202, a bus 204, a memory 206, peripherals 214, a power source 216, a network communication unit 218, a user interface 220, other suitable components, and/or any combination thereof.

The processor 202 can be a central processing unit (CPU), such as a microprocessor, and can include single or multiple processors, having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired and/or networked, including wirelessly networked. In some implementations, the operations of the processor 202 can be distributed across multiple physical devices and/or units that can be coupled directly or across a local area or other type of network. In some implementations, the processor 202 can include a cache, or cache memory, for local storage of operating data and/or instructions. The operations of the processor 202 can be distributed across multiple machines, which can be coupled directly or across a local area or other type of network.

The memory 206 can include volatile memory, non-volatile memory, and/or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), and/or any form of non-volatile memory capable of persistent electronic information storage, such as in the absence of an active power supply. The memory 206 can include another type of device, or multiple devices, now existing or hereafter developed, capable of storing data and/or instructions for processing by the processor 202. The processor 202 can access and/or manipulate data in the memory 206 via the bus 204. Although shown as a single block in FIG. 2A, the memory 206 can be implemented as multiple units. For example, a computing device 200 can include volatile memory, such as RAM, and persistent memory, such as a hard drive or other storage. The memory 206 can be distributed across multiple machines, such as network-based memory or memory in multiple machines performing the operations of clients and/or servers.

The memory 206 can include executable instructions 208; data, such as application data 210; an operating system 212; or a combination thereof for immediate access by the processor 202. The executable instructions 208 can include, for example, one or more application programs, which can be loaded and/or copied, in whole or in part, from non-volatile memory to volatile memory to be executed by the processor 202. The executable instructions 208 can be organized into programmable modules and/or algorithms, functional programs, codes, code segments, and/or combinations thereof to perform various functions described herein. For example, the executable instructions 208 can include instructions to invoke one or more discovery probes; retrieve software usage data based at least on the one or more discovery probes; determine software usage predictions based on the software usage data; allocate, based on the software usage predictions, per user software entitlements and per device software entitlements to obtain an allocation of software entitlements; and invoke installation or uninstallation of software responsive to the allocation of software entitlements.

The application data 210 can include, for example, user files; database catalogs and/or dictionaries; configuration information for functional programs, such as a web browser, a web server, a database server; and/or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself and/or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, a client and/or server can omit the peripherals 214. In some implementations, the power source 216 can be a battery, and the computing device 200 can operate independently of an external power distribution system. Any of the components of the computing device 200, such as the peripherals 214 or the power source 216, can communicate with the processor 202 via the bus 204. Although depicted here as a single bus, the bus 204 can be composed of multiple buses, which can be connected to one another through various bridges, controllers, and/or adapters.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; and/or any other human and machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
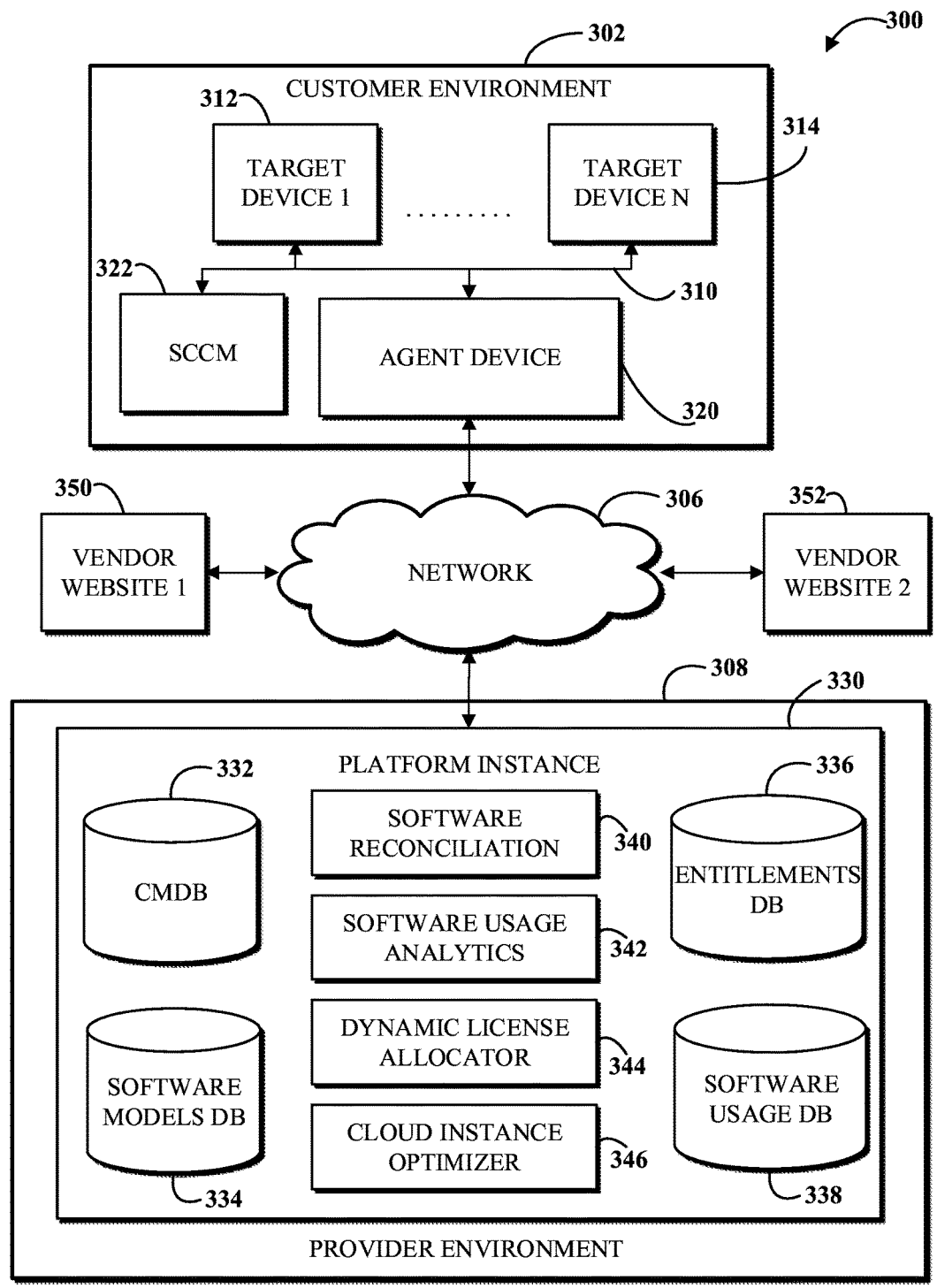
FIG. 3 is a block diagram of an implementation of a system usable for software asset management to facilitate computing network operations.

FIG. 3 is a block diagram of an implementation of a system 300 usable for software asset management to facilitate computing network operations. The system 300 can, for example, be implemented using some or all of electronic computing and communications system 100. For example, network 306 can be implemented using network 106, and platform instance 330 can be implemented using platform software executing on one or more application nodes 114 and data stored on one or more databases 118. For example, the platform software may be used to implement software reconciliation module 340, software usage analytics module 342, dynamic license allocator module 344, and cloud instance optimizer module 346. For example, CMDB 332, software models database 334, software entitlements database 336, and software usage database 338 may be implemented by storing their associated data in databases 118.

The system 300 includes a customer environment 302 that may be connected, via a network 306 (e.g., the Internet or some other wide area network), with a provider environment 308. Devices and software in the provider environment 308 may be used to provide operational management functions for computing resources in the customer environment 302. For example, a provider environment may be bounded by one or more datacenters 108, as shown in FIG. 1. For example, a customer environment may be bounded by one or more firewalls that separate the customer environment from the network 306.

The customer environment 302 may include a number of devices connected by a customer network 310 (e.g., a firewalled local area network), including, for example, a target device 1 312 through a target device N 314, an agent device 320, and System Center Configuration Manager (SCCM) 322. The provider environment 308 may include a platform instance 330 (e.g., running on a server device) and a CMDB 332 (e.g., running on a database server 116). The platform instance 330 may manage operations of the computing resources in the customer environment 302. The CMDB 332 may store models of the computing resources in the customer environment 302, including configuration items for target devices (e.g., the target device N 314) and for software components installed or running on the target devices in the customer environment 302.

The platform instance 330 is configured to manage computing resources in the customer environment 302 to match the installed software components to demand from users within the customer environment and software entitlements (e.g., software licenses) for the computing network and its users. Information about known software components may be stored in software models database 334. A record for a known software component in software models database 334 may include identifying information (e.g., product name, version, publisher name, product description, edition, language, and/or operating system) for the component as well as information about additional properties (e.g., specifications, processor and memory requirements, dependencies, and/or license terms) of the software component on which certain operational decisions for the customer environment 302 may depend. For example, software models database 334 may be implemented as software running on one or more database servers, such as database server 116. For example, the platform instance 330 may include a system operable to provision software in computing networks.

The platform instance 330 can initiate discovery of computing resources in the customer environment 302 by instructing the agent device 320, possibly referred to as a management instrumentation and discovery (MID) server or discovery server 320, to invoke discovery probes and return probe data to the platform instance 330. In some implementations, communications from the platform instance to the agent device 320 may be sent in response to a request from the agent device 320 to the platform instance (e.g., when the agent device 320 is behind a firewall and the platform instance is unable to initiate a connection to the agent device 320). In some implementations, discovery probes may be configured to interrogate the SCCM 322, which stores information about software components installed and/or running on one or more computing devices (e.g., target device 1 312 through target device N 314) within the customer environment 302. For example, a discovery probe may query the SCCM 322 to obtain data about the usage of software components installed on computing devices in the customer environment 302. For example, the obtained data may be received as discovery probe data by the platform instance 330 from the agent device 320. For example, the platform instance 330 may update records in the CMDB 332, based on discovery probe data, to represent software components installed on computing devices in the customer environment 302. For example, the platform instance 330 may update records in software usage database 338, based on discovery probe data, to represent usage patterns for software components used within the customer environment 302. For example, records in software usage database 338 may include the fields: product name, product version, publisher name, user ID; usage time, and usage count. These fields may be strings.

The platform instance 330 may also maintain information about software entitlements (e.g., software licenses) held for and/or available for the customer environment 302 and its users. Data about software entitlements may be stored in software entitlements database 336. Software entitlement data in software entitlement database 336 may be updated based on communications with software publisher websites, such as vendor website 1 350 and vendor website 2 352 to obtain updated information about software entitlements from those respective vendors.

The platform instance 330 may include modules for software asset management to facilitate computing network operations. For example, the platform instance may implement technique 400 of FIG. 4 to allocate software resources in a computing network subject to software entitlements. For example, the platform instance 330 may present software asset management data to users in the graphical display regions of FIGS. 7-14.

The platform instance 330 may include software reconciliation module 340 that is configured to match or reconcile software resource deployment to software entitlements held and software usage patterns in the customer environment 302. For example, the software entitlements may be procured or reclaimed for the customer environment 302 to match software installations discovered and represented in CMDB 322 and observed or predicted software usage patterns. For example, the software components may be installed or uninstalled on computing devices in the customer environment 302 to match software entitlements held and observed or predicted software usage patterns. For example, software reconciliation module 340 may implement technique 400 of FIG. 4.

The platform instance 330 may include software usage analytics module 342, which may be configured to analyze software usage data in software usage database 338 and determine predicted/estimated future usage of software components by users in the customer environment 302. The system 300 may leverage some analytics to improve usage of software entitlements (e.g., software licenses). For example, software usage analytics module 342 can perform a historical check of which user is more likely to install the same software on multiple machines. Named user licenses can then be allocated to the users with higher probability of installing the software on multiple machines in the future. Since multiple installs count as one license under "per-user" license models, this may reduce license costs. In some implementations, the system 300 may also track when licenses can be reallocated (e.g., once every 90 days), and at that point automatically initiate a reallocation procedure to improve the deployment of software components and reduce related licensing costs.

The platform instance 330 also includes dynamic license allocator module 344, which is configured to dynamically allocate or deallocate license rights, in an attempt to limit purchases at any given time an amount sufficient to support a number of concurrent users active at that time. For software that does not have reallocation time constraints, there is more flexibility to optimize. The system 300 may avoid buying licenses for every potential user, and rather buy for the actual number of concurrent users. Responsive to a user launching a software component, dynamic license allocator module 344 may allocate one right, and deallocate when the user signs off. Since typically the total number of concurrent users does not equal the total number of users, dynamic license allocator module 344 could help save money on licenses.

The platform instance 330 also includes cloud instance optimizer module 346, which is configured to adjust reserved instance purchases in public cloud based on usage data.

Where users of a computing network utilize public cloud software services, there may be a number of optimization opportunities. Public clouds may have reserved instances, where customers pay an upfront amount, and in return get reduced per hour costs. However, customers do not get back the upfront amount paid, even if they end up not using the instances. Cloud instance optimizer module 346 implements analytics that track reserved instance usage by users in a computing network (e.g., users in the customer environment 302), and suggest moving from more expensive on-demand instances if there is capacity left on the reserved instances a customer has already purchased. Cloud instance optimizer module 346 may use predictive analytics identify trends and advise customers ahead of time of effective purchases of reserved instances. Cloud instance optimizer module 346 may also perform cross cloud cost comparisons and migrations. Similarly, cloud instance optimizer module 346 can compare costs vs other comparable public cloud instances (e.g., comparing a public cloud service offerings from vendor website 1 350 and vendor website 2 352), and offer suggestions for cost reduction. Learning usage patterns of users in the customer environment 302 can help cloud instance optimizer module 346 predict future usage. In some implementations, cloud instance optimizer module 346 may call software usage analytics module 342 to determine predictions of future usage of public cloud services based on software usage data in software usage database 338. Different clouds have different prices, and we can run analysis of future projected costs by using pricing APIs of respective public cloud service providers (e.g., a pricing API of vendor website 1 350 and a pricing API of vendor website 2 352). Cloud instance optimizer module 346 may then provide guidance on which cloud service provider would be best for them over the long term. For example, if workloads are running on portable docker containers, then cloud instance optimizer module 346 may optionally move the workloads around, if the entire application is in a container and the customer opts-in for automatic moves. Cloud instance optimizer module 346 could also potentially compare on-premises costs vs public cloud costs, and provide cost reduction suggestions. For example, cloud instance optimizer module 346 may store data about pricing of public cloud service instances in software entitlements database 336, and may update software entitlements database 336 to reflect procurements or reclamations of reserved instances.

The modules of system 300 may be implemented directly in hardware, firmware, software executed by hardware, circuitry, or a combination thereof. For example, modules may be implemented using a machine-readable program or other computer-executable instructions, such as instructions or programs described according to JavaScript, C, or other such instructions.

Alternative implementations of system 300 are possible. For example, aspects of system 300 may be implemented using additional, less, or differently configured modules, devices, or components than those shown. For example, system 300 may omit or not use some or all of SCCM 322, dynamic license allocator module 344, cloud instance optimizer module 346, and vendor websites 350 and 352. For example, the functionality described with respect to software reconciliation module 340, software usage analytics module 342, dynamic license allocator module 344, and cloud instance optimizer module 346 may be implemented in a fewer or greater number of modules and may, for example, be implemented in a single software program. For example, CMDB 332, software models database 334, software entitlements database 336, and software usage database 338 may be implemented in different databases. For example, software models database 334 may instead be implemented by accessing an external data source, such as a software-as-a-service provider of normalized software models. For example, the aspects implemented within the provider environment 308 may instead be implemented as one or more application programs in an on-premises solution in the customer environment 302. For example, the agent device 320 may be omitted, and discovery may be carried out directly by one or more of the on-premises application programs.

Figure 4:
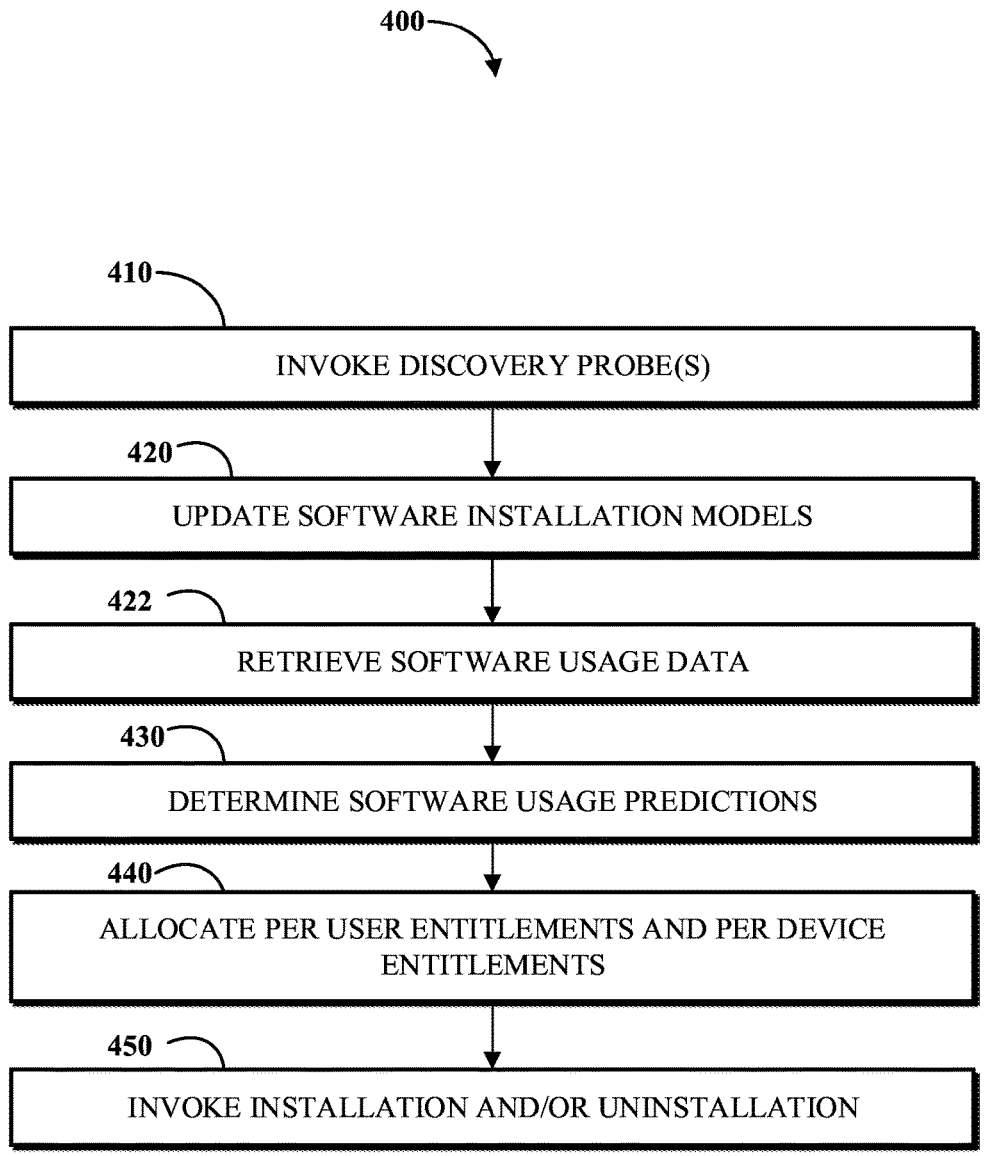
FIG. 4 is a logic flowchart illustrating an example of a technique for software resource allocation in a computing network subject to software entitlements.

FIG. 4 is a flowchart illustrating an example of a technique 400 for software resource allocation in a computing network subject to software entitlements in an electronic computing and communications system, such as the system 100 as generally illustrated in FIG. 1. In some implementations, the technique 400 can be executed using computing devices, such as the systems, modules, and devices described with respect to FIGS. 1, 2, and 3. In some implementations, the technique 400 can be performed, for example, by executing a machine-readable program or other computer-executable instructions, such as instructions or programs described according to JavaScript, C, or other such instructions. The steps, or operations, of the technique 400 or any other technique, method, process, or algorithm described in connection with the implementations disclosed herein can be implemented directly in hardware, firmware, software executed by hardware, circuitry, or a combination thereof.

The example technique 400 includes invoking 410 one or more discovery probes; updating 420 software installation models in a configuration management database based on the one or more discovery probes; retrieving 422 software usage data based at least on the one or more discovery probes; determining 430 software usage predictions based on the software usage data; allocating 440 per user software entitlements and per device software entitlements to obtain an allocation of software entitlements; and invoking 450 installation or uninstallation of software responsive to the allocation of software entitlements.

The example technique 400 may include invoking 410 one or more discovery probes. For example, a discovery probe may be invoked 410 against a target device (e.g., the target device N 314) in a computing network under management (e.g., in the customer environment 302) to obtain information about configuration and/or status of the target device, including software components installed and/or running on the target device. For example, invoking 410 a discovery probe may cause a database (e.g., the SCCM 322) in a computing network under management to be queried to obtain information about configuration and/or status of other computing resources in the computing network (e.g., target device 1 312 through target device N 314 and software components installed and/or running on those devices). For example, probe data obtained as result of a discovery probe may include information about software components installed and/or running on one or more computing devices operating in a computing network. In some implementations, a processor invoking 410 a discovery probe may execute instructions to communicate with a target device directly and retrieve configuration and/or status information from the target device. In some implementations, a processor invoking 410 a discovery probe may call on or instruct (e.g., via network communications signals) another processor to execute instructions to communicate with the target device and retrieve configuration and/or status information from the target device. For example, the platform instance 330 may invoke 310 a discovery probe by instructing the agent device 320 to execute the discovery probe.

The example technique 400 may include updating 420 software installation models in a configuration management database based on the one or more discovery probes. For example, one or configuration items in a configuration management database (e.g., the CMDB 332) may be updated 420 (e.g., added or modified) to reflect the installation of software components on one or more computing devices operating in a computing network under management (e.g., in the customer environment 302).

The example technique 400 may include retrieving 422 software usage data based at least on the one or more discovery probes. For example, the one or more discovery probes may result in probe data that is based on responses from the SCCM 322 that includes software usage data stored by the SCCM 322 reflecting software running on computing devices operating in the customer environment 302. In some implementations, the software usage data may include information about cloud services from one or more external service providers (e.g., vendor website 1 350) that are accessed by computing devices (e.g., target device N 314) operating in a computing network under management (e.g., in the customer environment 302). For example, previously stored software usage data for a computing network under management may be retrieved 422 from data storage (e.g., from the software usage database 338).

The example technique 400 may include determining 430 software usage predictions based on the software usage data. The software usage data may be analyzed to identify patterns or trends in software usage. Software usage predictions may be determined 430 based on the identified patterns or trends. For example, historical software usage data sorted by user may analyzed to check which users are more likely to install the same software on multiple machines. The software usage predictions may include information about cloud services from one or more external service providers. For example, machine learning techniques (e.g., neural networks, support vector machines, or decision trees) may be employed to determine 430 software usage predictions based on the software usage data. For example, the software usage analytics module 342 may be used to determine 430 software usage predictions based on the software usage data.

The example technique 400 may include allocating 440, based on the software usage predictions, per user software entitlements and per device software entitlements to obtain an allocation of software entitlements. In some implementations, allocating per user software entitlements and per device software entitlements to obtain the allocation of software entitlements is based on the software installation models. For example, how many copies of a software component a particular user has installed on different computing devices in a computing network under management may affect whether a per user software entitlement is allocated to the user or if a per device software entitlement is allocated to cover the user's usage. For example, the software entitlements may be allocated 440 by the software reconciliation module 340.

Software entitlements may be allocated 440 based on software entitlement metrics. In some implementations, software entitlement metrics may be determined based on the software usage predictions, the software installation models, and software entitlement data. For example, an expected cost of a software entitlement and/or an expected demand coverage factor for the software entitlement may be determined based on software entitlement data specifying a license metric (e.g., per user or per device) and a cost that are applied to predicted usage for a software components implicated by the software entitlement and/or installation models for those software components in the computing network under management.

In some implementations, per user software entitlements may be allocated 440 before allocating 440 per device software entitlements. For example, a software entitlements may be allocated 440 by grouping the software entitlements by publisher; for publishers having software entitlements, getting respective lists of software products of those publishers; For software products, getting a respective list of software models; using mapping conditions defined on the software model to identify a list of matching discovery models and use this to identify a list of matching software installs; allocating 440 using appropriate calculations based on license metric (e.g., if license metric is per device, counts the number of devices having the software installed); if a given software model has licenses with different license metrics (e.g., per named user and per user), allocate 440 in order based on priority of the license metrics: 1) per named user (allocated), 2) per named device (allocated), 3) per user, 4) per named user (unallocated), 5) per device, an finally 6) per named device (unallocated); and clearing caches for software model result, license metric result, and encoded query.

In some implementations, software entitlements are selected for allocation 440 based on comparison if information from multiple software vendors. For example, software entitlement parameters (e.g., license metric type and/or costs) may be received from a plurality of software vendor websites; a plurality of software entitlements may be compared based on the software entitlement parameters and the software usage predictions for a computing network under management; and a software entitlement may be selected based on the comparison of the plurality of software entitlements.

The example technique 400 may include invoking 450 installation or uninstallation of software responsive to the allocation of software entitlements. For example, software components installed one computing devices (e.g., the target device N 314) may be identified for reclamation based on the new allocation of software entitlements. For example, commands may be sent (e.g., via network communications signals from the platform instance 330) to a computing device (e.g., the target device N 314) to cause a software resource identified for reclamation to be uninstalled.

Although the technique 400 is shown as a series of operations for clarity, implementations of the technique 400 or any other technique, process, or algorithm described in connection with the implementations disclosed herein can be performed in various orders or concurrently. Additionally, operations in accordance with this disclosure can be performed with other operations not presented and described herein. For example, the technique 400 may be augmented to include selecting software entitlements for procurement based on the software installation models and the software usage predictions; and presenting data describing the selected software entitlements to a user. For example, the technique 400 may be augmented to include determining a recommendation to procure a reserved instance of a cloud service based on the software usage predictions. Furthermore, one or more aspects of the systems and techniques described herein can be omitted. For example, updating 420 software installation models in a configuration management database based on the one or more discovery probes is an operation that may be omitted.

Figure 5:
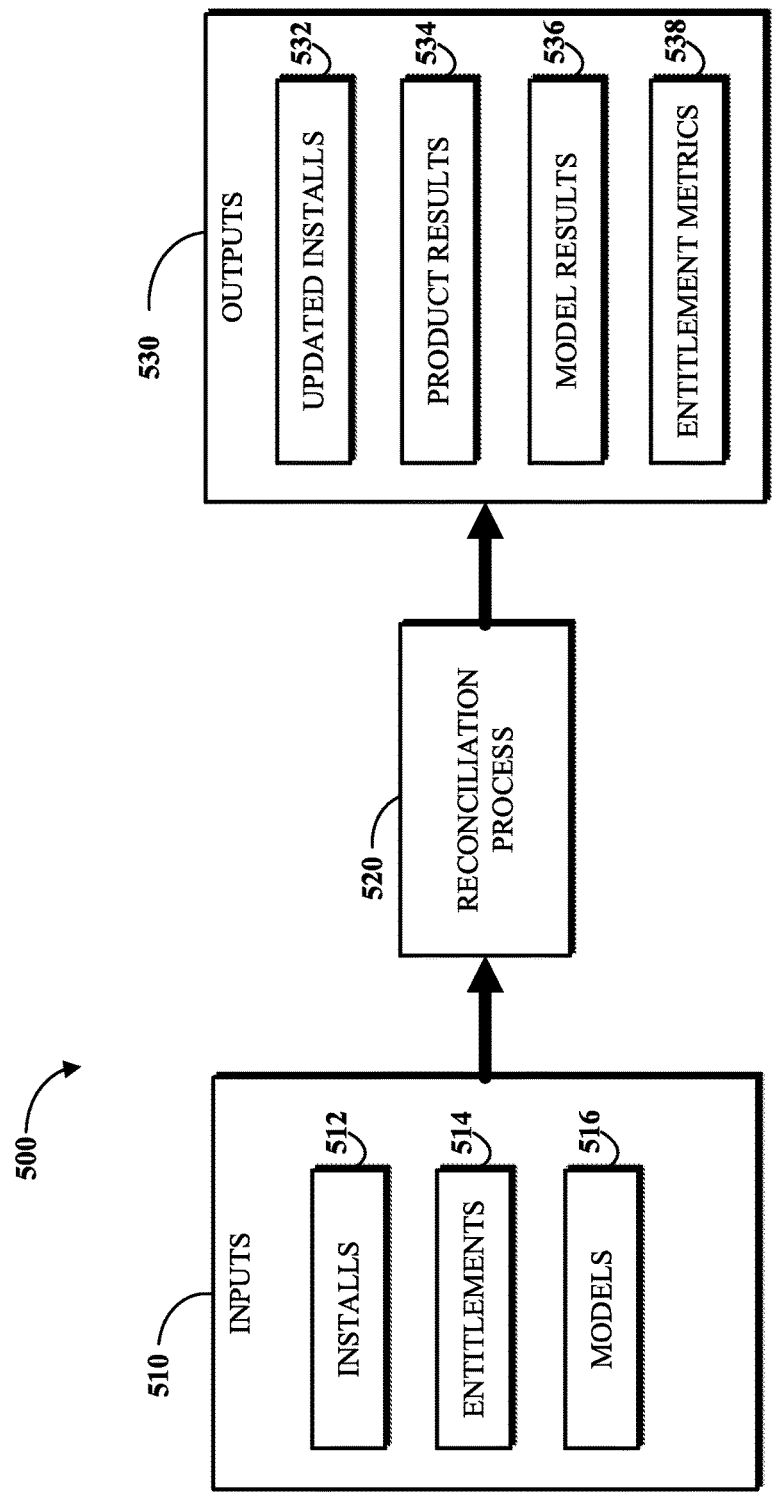
FIG. 5 is a block diagram of an implementation of a software reconciliation system.

FIG. 5 is a block diagram of an implementation of a software reconciliation system 500. The example system 500 includes a software reconciliation process 520 that takes a set of inputs 510 and determines a set of outputs 530 based on the inputs 510. The inputs 510 include software installs 512, software entitlements 514, and software models 516. The output 530 of the software reconciliation process include updated software installs 532, software product results 534, software model results 536, and software entitlement metric results 538. For example, the system 500 may be implemented using the application node 114 of FIG. 1. For example, the system 500 may be implemented using the computing device 200 of FIG. 2. For example, the system 500 may be implemented using the platform instance 330 of FIG. 3.

The inputs 510 include software installs 512, which may be determined by discovery processes (e.g., invoking one or more discovery probes to identify computing resources in a computing network under management). For example, discovery may utilize an SCCM integration plugin that causes an SCCM (e.g., the SCCM 322) to be queried to obtain information about computing resources (e.g., software components) installed and/or running on computing devices in the computing network. In some implementations, consideration during software reconciliation process 520 is focused on the software installs for licensable products. For example, large customer computing networks may have over 20 million records in a table of software installs 512 that are passed in to the software reconciliation process 520.

The inputs 510 include software entitlements 514 (e.g., software licenses) for the computing network under management. For example, software entitlements may be created by a software management module (e.g., a module running as part of the platform instance 330 of FIG. 3).

The inputs 510 include software models 516, which may be created by a software management module (e.g., a module running as part of the platform instance 330 of FIG. 3) or auto-generated when user creates a software entitlement for a publisher part number included in software asset management software content. A software model 516 may represent a specific licensable version/edition of a software product. Some examples of software models 516 are Microsoft Excel® or Microsoft Excel 2012®. A software model 516 may include model parameters and metadata describing the represented software version/edition. For example, the parameters and metadata for a software model 516 may include, a name, a publisher, a product, a short description, a model number, an acquisition method, a cost, a release date, an end of life date, an owner or authorized user, and comments (e.g., from a network administrator). A record for a software model 516 may link to records for a corresponding software product and/or related software products or versions.

The software reconciliation process 520 compares the software entitlements for a computing network to the detected information about the current state of deployment (e.g., installations and/or usage data) of software components in the computing network and/or to predictions of future installation and usage patterns in the computing network. The software reconciliation process 520 may identify mismatches between the software entitlements held for the computing network and the actual or anticipated usage of software components implicated by the software entitlements. The software reconciliation process 520 may recommend and/or automatically implement corrective actions to address identified mismatches, such as installing or uninstalling software components on computing device in the computing network and procuring or reclaiming software entitlements.

The outputs 530 include updated software installs 532 (e.g., stored as records in a table of software installs). For example the updated software installs 532 may indicate changes caused by installing or uninstalling software components in the computing network based on analysis by the software reconciliation process 520.

The outputs 530 include software product results 534 that aggregate the results (e.g., true-up cost or under-utilization metrics for existing software entitlements) for all the software models within a given software product. For example, software products results 534 may be presented (e.g., transmitted and/or displayed) to a user (e.g., a system administrator) to facilitate decisions on which software products should be procured, or reclaimed.

The outputs 530 include software model results 536. For example, software model results may include summary results for a software model indicating compliance status, true-up cost, over-licensed amount, and number of unlicensed installs.

The outputs 530 include software entitlement metric results 538. The software entitlement metric results 538 may include summary results for a given software model and license type (e.g., per user, per device, etc.) indicating number of rights owned, rights used, rights needed, unused rights, and/or allocation status.

Figure 6:
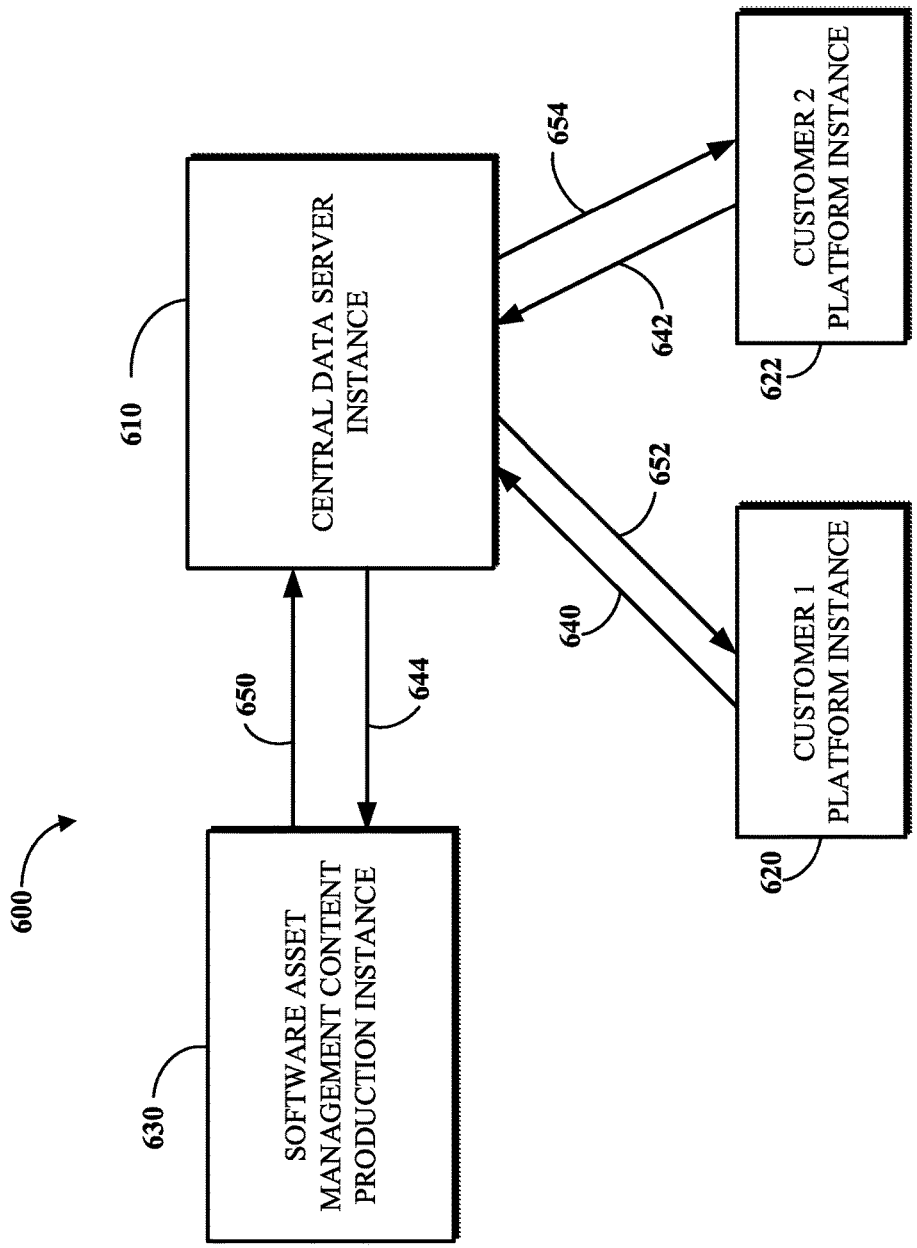
FIG. 6 is a block diagram of an implementation of a system usable for sharing software asset management content among multiple customer platform instances that manage respective customer computing networks.

FIG. 6 is a block diagram of an implementation of a system 600 usable for sharing software asset management content among multiple customer platform instances that manage respective customer computing networks. For example, software asset management content may include software publisher data, software product data, software package data, Normalization rules that can be used to match discovered software to the predefined software packages or products, software entitlement definitions, software product definitions, product process names, processor normalization rules, and processor core factor mapping rules. Since the software asset management content will continue to evolve as software vendors ship new versions of software, data may be stored on a central instance that provides a mechanism for customer instances to retrieve the latest content. The system 600 may also provide a mechanism by which customers can report their normalization misses to the system 600. By default, this may be turned off and customers can opt-in to have their data shared in the system 600. If the customer opts in, data from customer instances will be pushed to a central data server instance 610. For example, the data that will be pushed back to the central data server instance 610 may include discovered publisher, discovered software product, and discovered software version. For manually normalized records (where customer has manually chosen the matching software), selected normalized publisher, product, version, edition, language, platform data may also be sent to the central data server instance 610. In some implementations, processor name, CPU core count, and CPU speed may be sent for the processors for which an application was unable to find a matching core factor. In some implementations, custom pattern based normalization rules created by the customer may also be sent to the central data server instance 610. The customer data for these normalization misses pushed from the customer instances may be processed by the system 600 to update the software asset management content (e.g., to create new software products, packages, software normalization rules, processor normalization rules and/or core factor mapping rules). The updated software asset management content can then be pushed to the central data server instance 610 so that the content is available to be downloaded and used by customer instances.

The system 600 includes a central data server instance 610 running on one or more server devices (e.g., the application server 112 or the computing device 200). The central data server instance 610 may distribute software asset management content (e.g., software component normalization rules) to a plurality of customer platform instances (e.g., customer 1 platform instance 620 and customer 2 platform instance 622) running on one or more server devices (e.g., the application server 112 or the computing device 200). The central data server instance 610 may receive updates to the software asset management content it stores from a software asset management content production instance 630 running on one or more server devices (e.g., the application server 112 or the computing device 200). The central data server instance 610 may also relay information about computing resource normalization misses from the customer instances (620 and 622) to the software asset management content production instance 630, which may update the software asset management content based on and/or responsive to these normalization misses encountered during discovery operations in the customer computing networks. For example, the central data server instance 610, the customer instances (620 and 622) and the software asset management content production instance 630 may be implemented as software running on one or more application servers (e.g., such as application server 112) operating within a service provider environment (e.g., the datacenter 108 or the provider environment 308).

The central data server instance 610 may utilize a push/pull mechanism to distribute content. The central data server instance 610 may be configured to process pull requests from the plurality of customer platform instances (620 and 622) to provide software model data. The central data server instance 610 may also be configured to process push requests from the plurality of customer platform instances to receive unrecognized discovery probe data (e.g., discovery probe data that could not be mapped to a known computing resource using current normalization rules and thus resulted in a normalization miss). For example, the unrecognized discovery probe data may include a discovered software publisher sting, a discovered software product string, and a discovered software version string. For example, the unrecognized discovery probe data may include a processor name, a processor core count, and a processor speed. The central data server instance 610 may be configured to process pull requests from the software asset management content production instance to provide the unrecognized discovery probe data. The central data server instance 610 may also be configured to process push requests from the content production instance to receive software model data (e.g., normalization rules).

In some implementations, a customer instance (e.g., 620 or 622) initiates push of data corresponding to a normalization miss after a user (e.g., a system administrator) of the customer computing network has manually identified the computing resource that was not automatically recognized using the current normalization rules. The user may choose to push the manually specified parameters of the computing resource along with the corresponding unrecognized discovery probe data to facilitate update of normalization rules or other software asset management content in the system 600. For example, processing a push requests from one of the plurality of customer platform instances (e.g., 620 or 622) may cause the central data server instance 610 to receive normalized records including a manually entered software publisher string, a manually entered software product string, a manually entered software version string, a manually entered software edition string, a manually entered software language string, and a manually entered software platform string. In some implementations, the central data server instance 610 may be configured to receive custom pattern based normalization rules that are pushed by one or more of the plurality of customer platform instances (e.g., 620 or 622).

In an example scenario, the customer instances (320 and 322) may push (640 and 642) normalization miss data to the central data server instance 610 (e.g., periodically or as it is encountered during discovery operations). The software asset management content production instance 630 may in turn pull 644 the normalization miss data from the central data server instance 610 (e.g., periodically or on-demand). Updated software asset management content (e.g., computing resource normalization rules) may be determined responsive to the normalization miss data. For example, the normalization miss data may be automatically (e.g., using a machine learning process) or manually (e.g., by a user) analyzed to generate a new normalization rule to cover a software product or deployment scenario implicated by the normalization miss data. The software asset management content production instance 630 may push 650 updated software asset management content (e.g., computing resource normalization rules) to the central data server instance 610 for distribution The customer instances (320 and 322) may pull (652 and 654) updated software asset management content from the central data server instance 610 (e.g., periodically or on-demand as it is used).

For example, the central data server instance 610 may define the tables that will contain data to be pulled by customers platform instances (e.g., 320 and 322); define a scripted REST API that will be called by the software asset management content production instance 630 when pushing data to the central data server instance 610; and transform the data pushed from customer platform instances (e.g., 320 and 322) into tables that may be pulled by the software asset management content production instance 630.

In some implementations, there are two main tables used in pulling data from the central data server instance 610 to a customer platform instance (e.g., 320 and 322). A first table specifies the download schedule for each of the tables being pulled. For example, a record in first table may cause the pull the data on a daily basis, where the time of day of the pull will be randomized. A second table specifies the source table on the server, the destination table on the client, the fields to be pulled, and the mapping (for the scenario where column names are different between the source table and the destination table). When a data download is initiated by the scheduled job, the standard platform Table API is used to make a REST call to the server to retrieve the data from the server for all the records that have been updated on the server since the last time data was downloaded to the client for that table. For example, data may be transferred from central data server instance 610 in batches of 5000, with the data being compressed and streamed. Records that do not exist on the customer platform instance (e.g., 320 and 322) may be created and records that already exist may be updated.

For example, a customer can opt-in to have their data sent to the central data server instance 610, which will allow the system 600 to more efficiently create new software normalization and processor normalization rules that can then be received by customers in subsequent content downloads. In some implementations, the central data server instance 610 will only accept push requests from production instances. For example, data that is sent from customer platform instances to the central data server instance 610, may be inserted data into a staging table. The staging table may have a table cleaner that will clean the table periodically (e.g., every 7 days). If enabled, push to the central data server instance 610 may be invoked via a periodically (e.g., weekly) scheduled job. The exact time of the push may be randomized. Access to the tables of the central data server instance 610 may limited using one or more access control lists.

Figure 7:
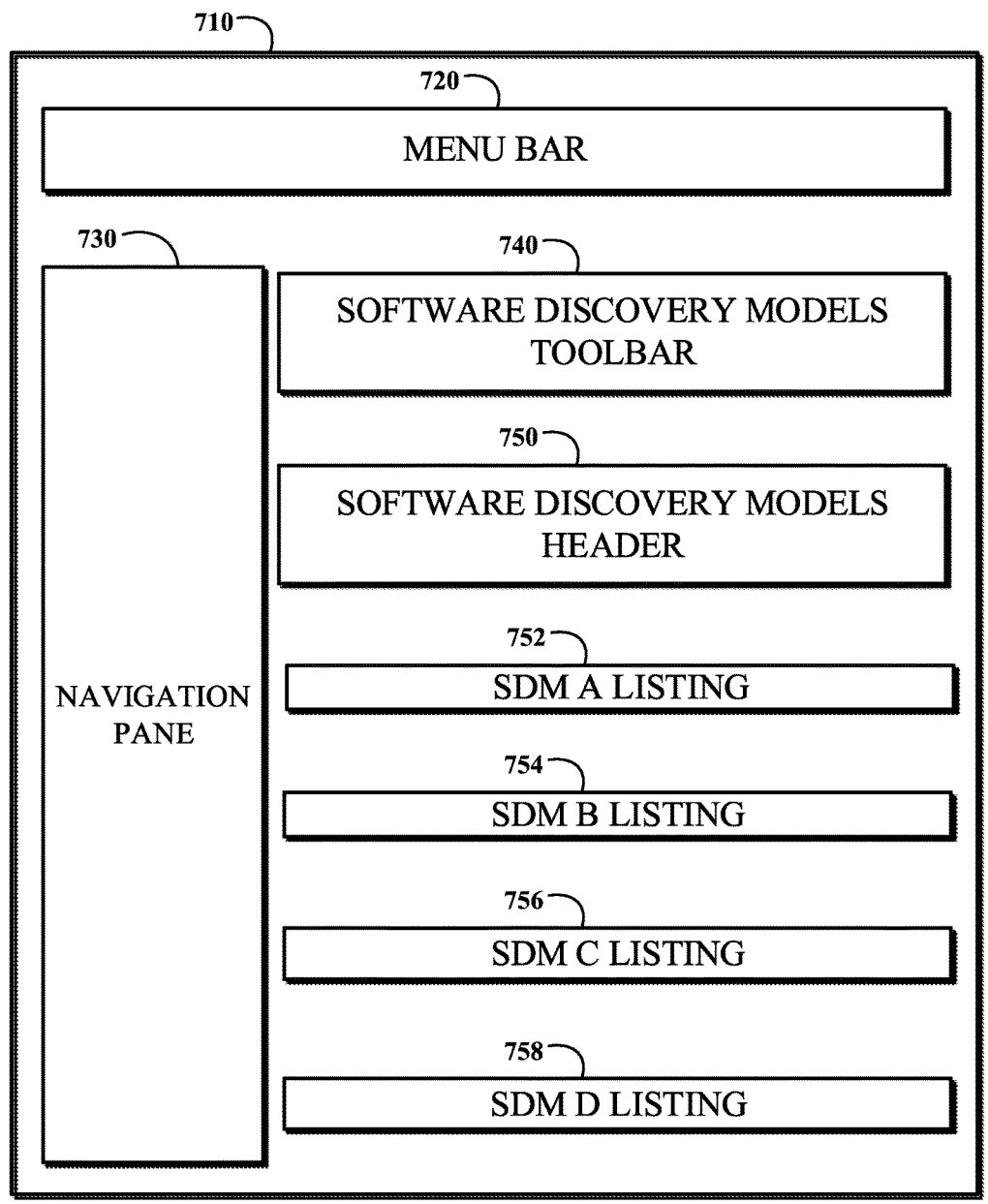
FIG. 7 is a diagram of an example display region generated for presenting information about software discovery models in a computing network.

FIG. 7 is a diagram of an example display region 710 generated for presenting information about software discovery models in a computing network. The display region 710 includes a menu bar 720; a navigation pane 730; a software discovery models toolbar 740; a software discovery models header 750; and software discovery model (SDM) listings 752, 754, 756, and 758. For example, the display region 710 may be generated by the user interface 220 of FIG. 2. For example, the display region 710 may be generated based on data stored in CMDB 332 of FIG. 3.

The menu bar 720 may include a user icon reflecting the status of a currently logged in user, a search icon, a chat icon, a help icon, a setup icon, an options icon, and a proxy selection drop-down menu. The navigation pane 730 may include a search box, a favorites icon, and a site map or tree. The software discovery models toolbar 740 may include a listing configuration icon, a search box with a drop-down field/column selector, and paging icons. The software discovery models header 750 may list column headings that may include names for attributes or metadata that are displayed in the area of the display region 710 below the software discovery models header 750.

The area of the display region 710 below the software discovery model header 750 may include one or more SDM listings for model data for computing resources (e.g., software components) found within a private network through discovery operations. In this example, four SDM listings 752, 754, 756, and 758 are displayed below the software discovery model header 750. The SDM listings 752, 754, 756, and 758 may display values of attributes of or metadata for corresponding computing resources discovered in a customer computing network. For example, an SDM listing (e.g., SDM listing A 752, SDM listing B 754, SDM listing C 756 or SDM listing D 758) may include a name of a computing resource; a normalization status (e.g., normalized, match not found, or manually normalized) for an associated computing resource (e.g., a software component); a publisher (e.g., "Adobe Systems"®, "IBM"®, or "Microsoft"®) for the computing resource; a product identifier (e.g., "Acrobat"®, "Illustrator"®, "Captivate"®, "Photoshop" "Dreamweaver"®, "Fireworks"®, "JProfiler"®, "Lotus Notes"®, "Windows Server 2012"®, or "SQL server"®) for the computing resource; a version; and/or an edition (e.g., "standard" or "professional") for the computing resource.

Figure 8:
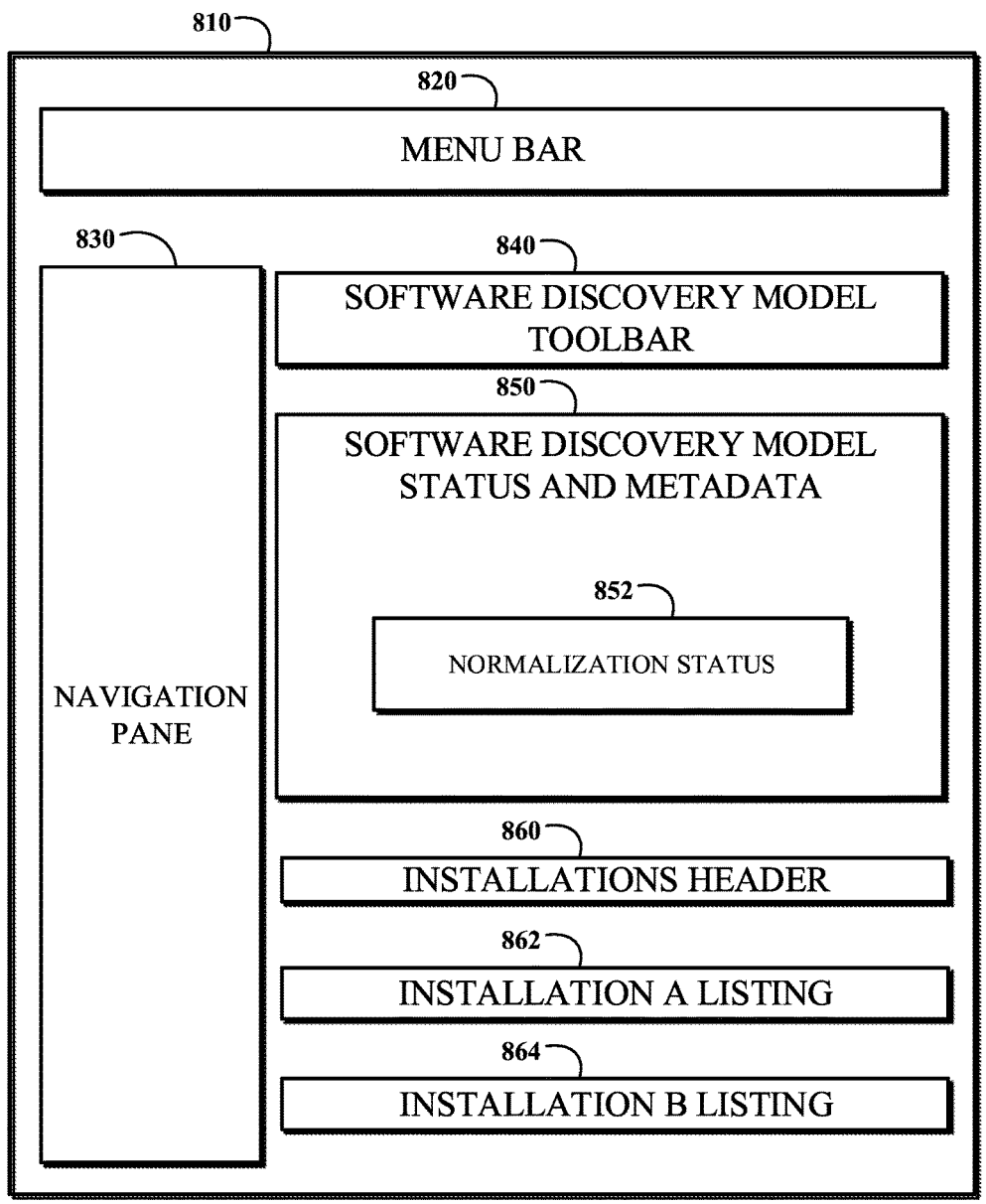
FIG. 8 is a diagram of an example display region generated for presenting information about a software discovery model in a computing network and receiving user commands related to the software discovery model.

FIG. 8 is a diagram of an example display region 810 generated for presenting information about a software discovery model in a computing network and receiving user commands related to the software discovery model. The display region 810 includes a menu bar 820; a navigation pane 830; a software discovery model toolbar 840; software discovery model status and metadata 850; a software installations header 860; and software installation listings 862 and 864. For example, the display region 810 may be generated by the user interface 220 of FIG. 2. For example, the display region 810 may be generated based on data stored in CMDB 332 of FIG. 3.

The menu bar 820 may include a user icon reflecting the status of a currently logged in user, a search icon, a chat icon, a help icon, a setup icon, an options icon, and a proxy selection drop-down menu. The navigation pane 830 may include a search box, a favorites icon, and a site map or tree. The software discovery model toolbar 840 may include a display configuration icon, an attachment icon, a settings icon, an update/refresh icon, and next discovery model and previous discovery model icons.

The discovery model status and metadata 850 may include a normalization status 852 for the discovered software component (e.g., normalized, match not found, or manually normalized). The discovery model status and metadata 850 may also include a display name; a normalized publisher; a normalized product identifier; a normalized version; a discovered publisher; a discovered product identifier; a discovered version; a product type (e.g., licensable); a platform (e.g., "Windows"® or "Linux"®); a language (e.g., English); an edition; and/or a full version identifier.

The software installations header 860 may list column headings that may include names for attributes or metadata that are displayed in the area of the display region 810 below the software installations header 860. The area of the display region 810 below the software installations header 860 may include one or more software installation listings for a software components found, through discovery operations, to be installed within a private network (e.g., within the customer environment 302 of FIG. 3). In this example, two software installation listings 862 and 864 are displayed below the software installations header 860. The software installation listings 862 and 864 may display values of attributes of or metadata for corresponding software components discovered in a customer computing network. For example, a software installation listing (e.g., installation listing A 862 or installation listing B 864) may include a name of a software component; a publisher (e.g., "Adobe Systems"®, "IBM"®, or "Microsoft"®) for the software component; a version for the software component; and/or an identifier of a computing device on which the software component is installed.

Figure 9:
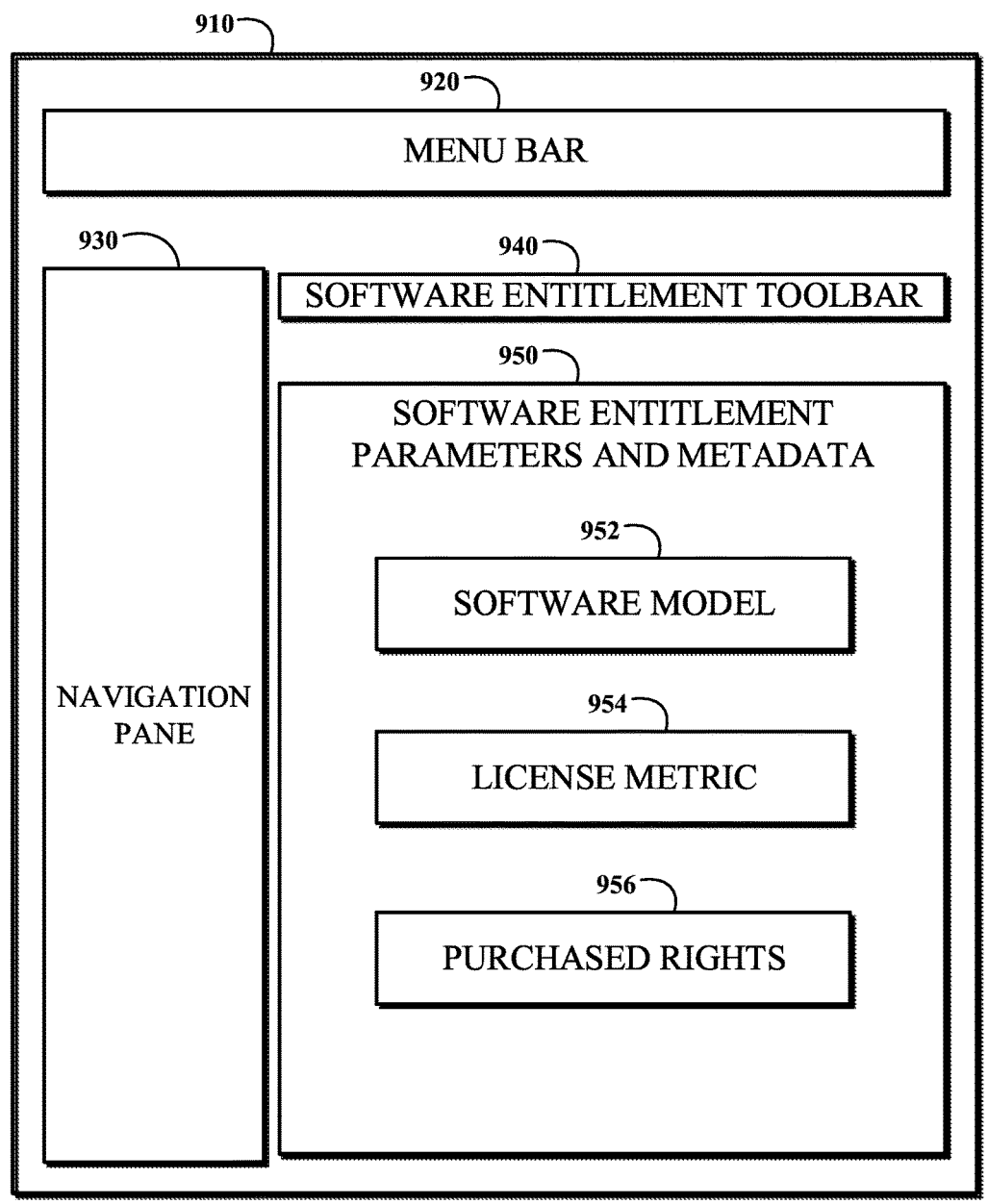
FIG. 9 is a diagram of an example display region generated for presenting information about a software entitlement in a computing network.

FIG. 9 is a diagram of an example display region 910 generated for presenting information about a software entitlement in a computing network. The display region 910 includes a menu bar 920; a navigation pane 930; a software entitlement toolbar 940; and software entitlement parameters and metadata 950. For example, the display region 910 may be generated by the user interface 220 of FIG. 2. For example, the display region 910 may be generated based on data stored in software entitlement database 336 of FIG. 3.

The menu bar 920 may include a user icon reflecting the status of a currently logged in user, a search icon, a chat icon, a help icon, a setup icon, an options icon, and a proxy selection drop-down menu. The navigation pane 930 may include a search box, a favorites icon, and a site map or tree. The software entitlement toolbar 940 may include a display configuration icon, an attachment icon, a settings icon, and a submit icon (e.g., for updating software entitlement database 336).

The software entitlement parameters and metadata 950 may include a software model identifier or link 952 (e.g., identifying a software model stored in software models database 334 and accessible through display region 810 of FIG. 8). The software entitlement parameters and metadata 950 may include a license metric 954 (e.g., per user, per device, per named user, or none). The software entitlement parameters and metadata 950 may include a purchased rights 956, which may be a count of purchased rights in units of the license metric 954. The software entitlement parameters and metadata 950 may also include a display name; a publisher part number; a product type (e.g., full); a metric group (e.g., common); active rights (e.g., a count in the units of the license metric 954 of the license rights currently being used or used during a recent period of time); an asset tag; a state (e.g., in use or unused); assigned to (e.g., a user name); managed by (e.g., a user name); owned by (e.g., a user name); parent (e.g., identifier or pointer to another software entitlement, such as for a base version of a software component on which a software component implicated by the software entitlement depends, that is needed to use the software entitlement; a serial number; a location where the software component is installed and/or licensed to be installed; a department that is authorized to use the software entitlement; a company that is authorized to use the software entitlement; a assigned groups of users; an installed indicator that indicates how many copies of the software component implicated by the software entitlement are currently installed in the computing network under management (e.g., the customer environment 302); and/or comments from a user (e.g., a system administrator).

Figure 10:
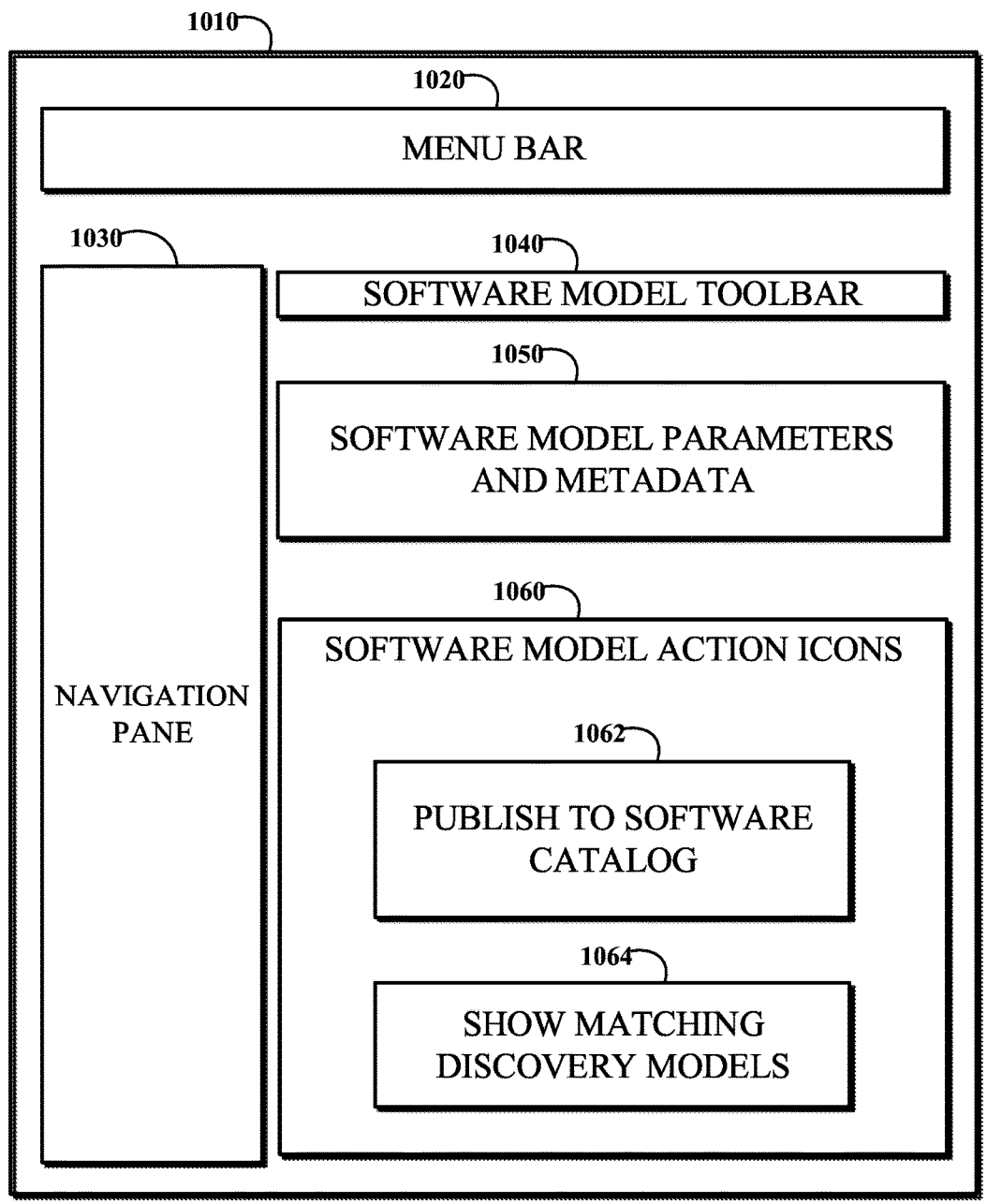
FIG. 10 is a diagram of an example display region generated for presenting information about a software model in a computing network and receiving user commands related to the software model.

FIG. 10 is a diagram of an example display region 1010 generated for presenting information about a software model in a computing network and receiving user commands related to the software model. The display region 1010 includes a menu bar 1020; a navigation pane 1030; a software model toolbar 1040; software model parameters and metadata 1050; and software model action icons 1060. For example, the display region 1010 may be generated by the user interface 220 of FIG. 2. For example, the display region 1010 may be generated based on data stored in software models database 334 of FIG. 3.

The menu bar 1020 may include a user icon reflecting the status of a currently logged in user, a search icon, a chat icon, a help icon, a setup icon, an options icon, and a proxy selection drop-down menu. The navigation pane 1030 may include a search box, a favorites icon, and a site map or tree. The software model toolbar 1040 may include a display configuration icon, an attachment icon, a settings icon, an update/refresh icon (e.g., for updating a record in software model database 334), and a delete icon (e.g., for deleting a corresponding record in software model database 334).

The software model parameters and metadata 1050 may include a display name; a publisher; a product identifier; a short description (e.g., a manually entered string); a version; a platform (e.g., "Windows"® or "Linux"®); a language (e.g., English); an edition; and/or a full version identifier; a model number; a model category; a barcode, an owner, a next version for upgrade; a status (e.g., in production), an expenditure type, an indication of certification; an asset tracking strategy (e.g., leave to category); an acquisition method; a cost (e.g., in dollars); a depreciation model (e.g., a percentage); a salvage value (e.g., in dollars); a release date; an end of life date; discovery normalization/mapping rules; software suite components; software suite parents; and/or comments from a user (e.g., a system administrator).

The software model action icons 1060 may include a publish to software catalog icon 1062 (e.g., for pushing the software model data to the central data server instance 610, as described in relation to FIG. 6). The software model action icons 1060 may include a show matching discovery models icon 1064 (e.g., for showing a listing similar to the display region 710 of FIG. 7 of software discovery models that have been normalized to map to this software model).

Figure 11:
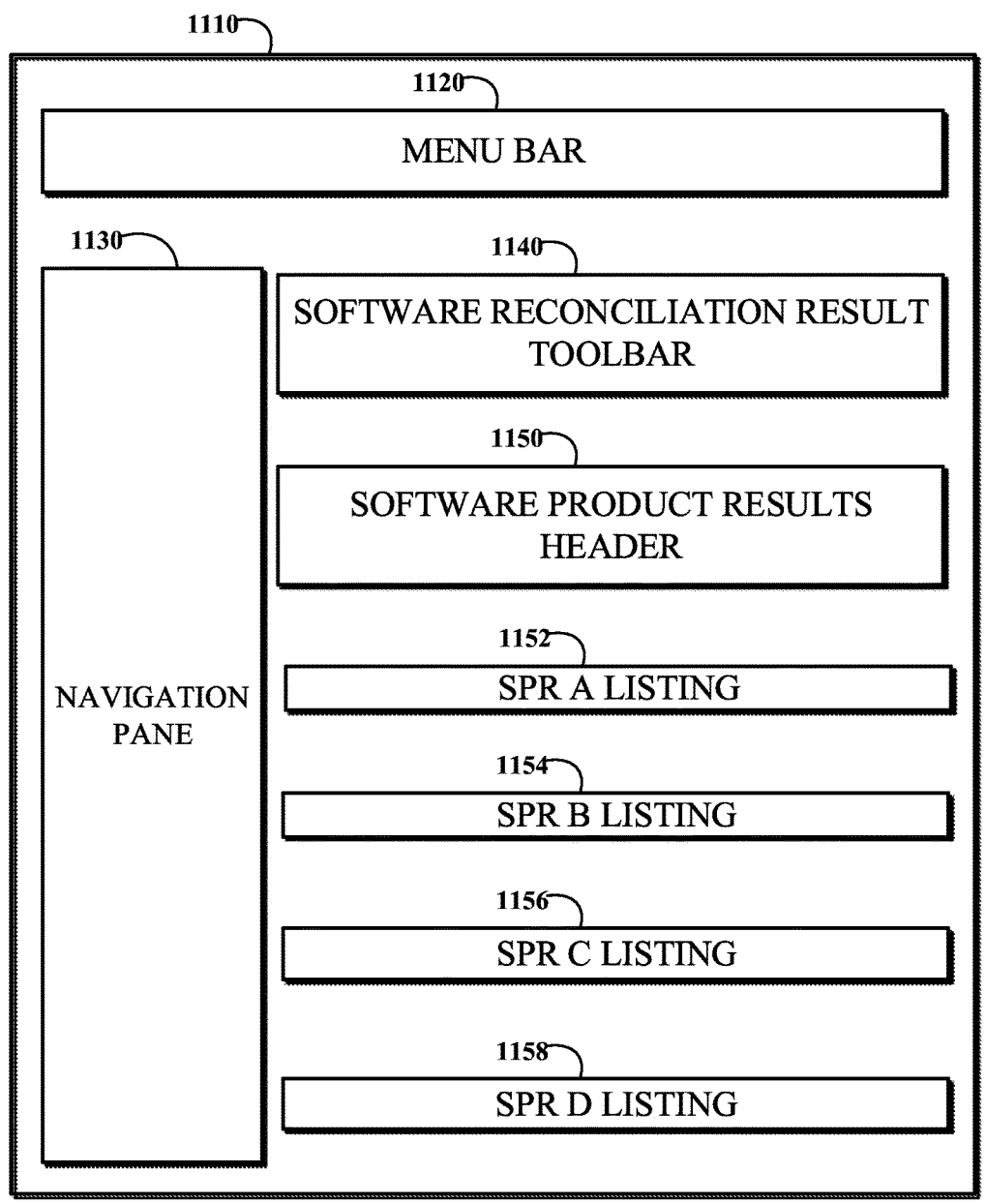
FIG. 11 is a diagram of an example display region generated for presenting information about the results of a software reconciliation process in a computing network.

FIG. 11 is a diagram of an example display region 1110 generated for presenting information about the results of a software reconciliation process in a computing network. The display region 1110 includes a menu bar 1120; a navigation pane 1130; a software reconciliation result toolbar 1140; a software product results header 1150; and software product result (SPR) listings 1152, 1154, 1156, and 1158. For example, the display region 1110 may be generated by the user interface 220 of FIG. 2. For example, the display region 1110 may be generated based on results determined by software reconciliation module 340 of FIG. 3. For example, the display region 1110 may be generated based on results determined by software reconciliation module 340 of FIG. 3. For example, the display region 1110 may be generated based on software product results 534 of software reconciliation process 520 of FIG. 5.

The menu bar 1120 may include a user icon reflecting the status of a currently logged in user, a search icon, a chat icon, a help icon, a setup icon, an options icon, and a proxy selection drop-down menu. The navigation pane 1130 may include a search box, a favorites icon, and a site map or tree. The software reconciliation results toolbar 1140 may include a listing configuration icon, a number identifying the reconciliation result being presented, a scope for the reconciliation process (e.g., for all software publishers or for a particular software publisher), a status (e.g., completed or in progress), a last reconciled time when the reconciliation processes was last completed, a search box with a drop-down field/column selector, a settings icon, and paging icons.

The software product results header 1150 may list column headings that may include names for attributes or metadata that are displayed in the area of the display region 1110 below the software product results header 1150. The area of the display region 1110 below the software product results header 1150 may include one or more SPR listings for product result data for computing resources (e.g., software components) found within a private network through discovery operations. In this example, four SPR listings 1152, 1154, 1156, and 1158 are displayed below the software product results header 1150. The SPR listings 1152, 1154, 1156, and 1158 may display values of attributes of or metadata for corresponding computing resources discovered in a customer computing network and/or implicated by software entitlements held for the customer computing network. For example, an SPR listing (e.g., SPR listing A 1152, SPR listing B 1154, SPR listing C 1156 or SPR listing D 1158) may include an identifier of a software product reconciliation result; a publisher (e.g., "Adobe Systems"®, "IBM"®, or "Microsoft"®) for the software product; a product identifier (e.g., "Acrobat"®, "Illustrator"®, "Captivate"®, "Photoshop" "Dreamweaver"®, "Fireworks"®, "JProfiler"®, "Lotus Notes"®, "Windows Server 2012"®, or "SQL server"®) for the software product; a status (e.g., compliant with software entitlements or not compliant with software entitlements) for the software product; a true-up cost (e.g., in dollars) to procure software entitlements sufficient for compliance; an over-licensed amount (e.g., in dollars) reflecting the costs of un used software entitlements held; and/or a potential savings (e.g., in dollars) that could be realized by reclaiming software entitlements eligible for immediate reclamation.

Figure 12:
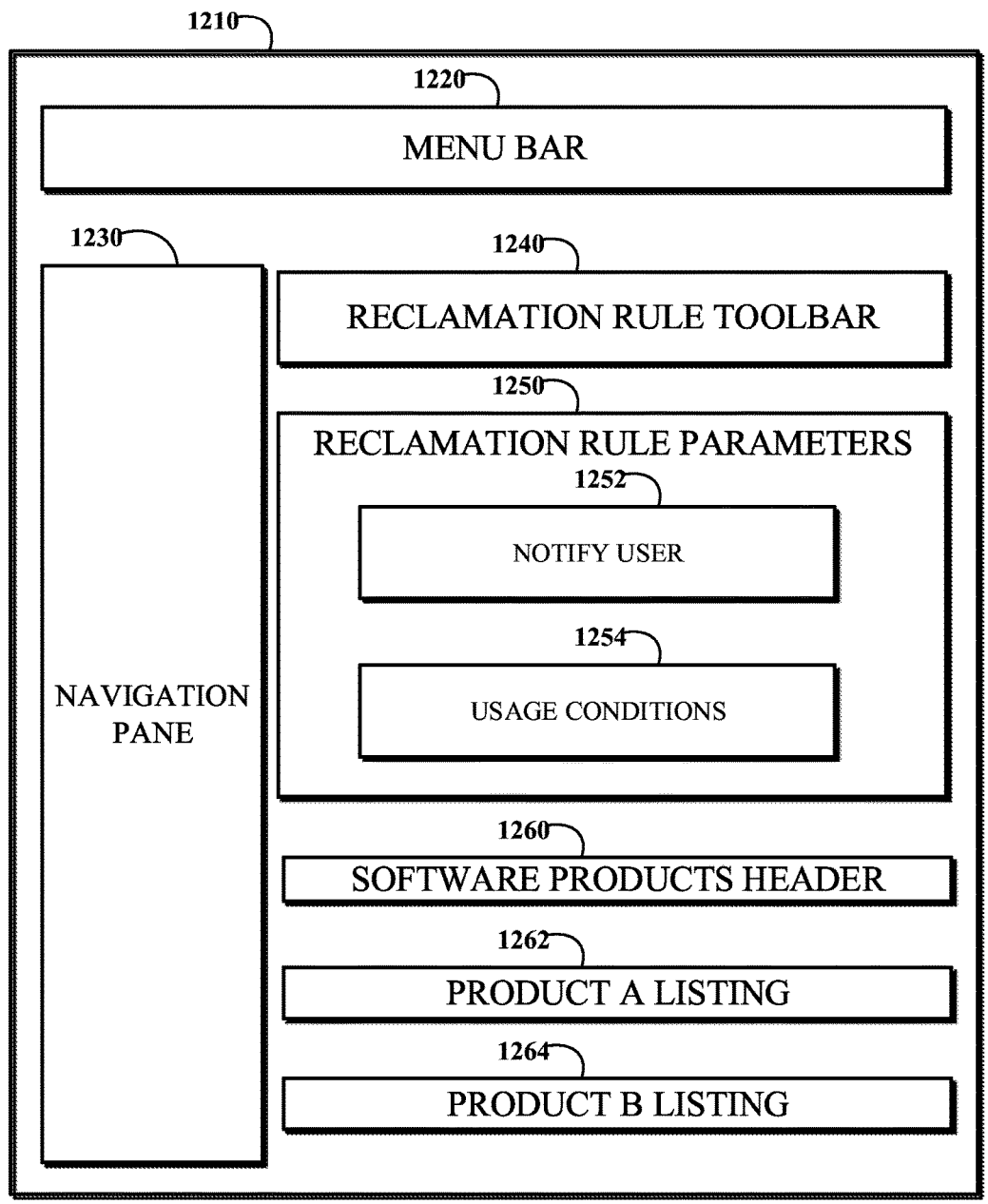
FIG. 12 is a diagram of an example display region generated for presenting information about a reclamation rule in a computing network and receiving user commands related to the reclamation rule.

FIG. 12 is a diagram of an example display region 1210 generated for presenting information about a reclamation rule in a computing network and receiving user commands related to the reclamation rule. The display region 1210 includes a menu bar 1220; a navigation pane 1230; a reclamation rule toolbar 1240; reclamation rule parameters 1250; a software products header 1260; and software product listings 1262 and 1264. For example, the display region 1210 may facilitate user review and editing of reclamation rules used to determine software reclamation targets during a software reconciliation process. For example, the display region 1210 may be generated by the user interface 220 of FIG. 2. For example, the display region 1210 may be generated based on rules applied by software reconciliation module 340 of FIG. 3. For example, the display region 1210 may be generated based on rules applied by software reconciliation process 520 of FIG. 5.

The menu bar 1220 may include a user icon reflecting the status of a currently logged in user, a search icon, a chat icon, a help icon, a setup icon, an options icon, and a proxy selection drop-down menu. The navigation pane 1230 may include a search box, a favorites icon, and a site map or tree. The reclamation rule toolbar 1240 may include a title, a back icon, an attachment icon, a settings icon, an update/refresh icon, a delete icon, and next software reclamation rule and previous software reclamation rule icons.

The reclamation rule parameters 1250 may include a notify user icon 1252 for the reclamation rule (e.g., when this icon is activated a user may be notified prior to a schedule reclamation of the software component assigned to the user). The reclamation rule parameters 1250 may include usage conditions 1254, such as total hours used and a period of time (e.g., the last month or the last six months) to aggregate usage over. The usage conditions 1254 specify conditions to be met in order to trigger a reclamation of a software component implicated by the reclamation rule. The reclamation rule parameters 1250 may also include an identifier of the reclamation rule, an active/enabled indicator (e.g., a Boolean value) for the software reclamation rule, and a number of days before a noticed auto-reclamation of a software component will be carried out.

The software products header 1260 may list column headings that may include names for attributes or metadata that are displayed in the area of the display region 1210 below the software products header 1260. The area of the display region 1210 below the software products header 1260 may include one or more software product listings for software products implicated by the software reclamation rule. In this example, two software product listings 1262 and 1264 are displayed below the software products header 1260. The software product listings 1262 and 1264 may display values of attributes of or metadata for software products implicated by the reclamation rule. For example, a software product listing (e.g., product listing A 1262 or product listing B 1264) may include a name (e.g., "Acrobat"®, "Illustrator"®, "Captivate"®, "Photoshop" "Dreamweaver"®, "Fireworks"®, "JProfiler"®, "Lotus Notes"®, "Windows Server 2012"®, or "SQL server"®); a publisher (e.g., "Adobe Systems"®, "IBM"®, or "Microsoft"®) for the software product; a product type (e.g., licensable); and/or a product classification (e.g., "graphics or photo imaging", "word processing", or "spreadsheet").

Figure 13:
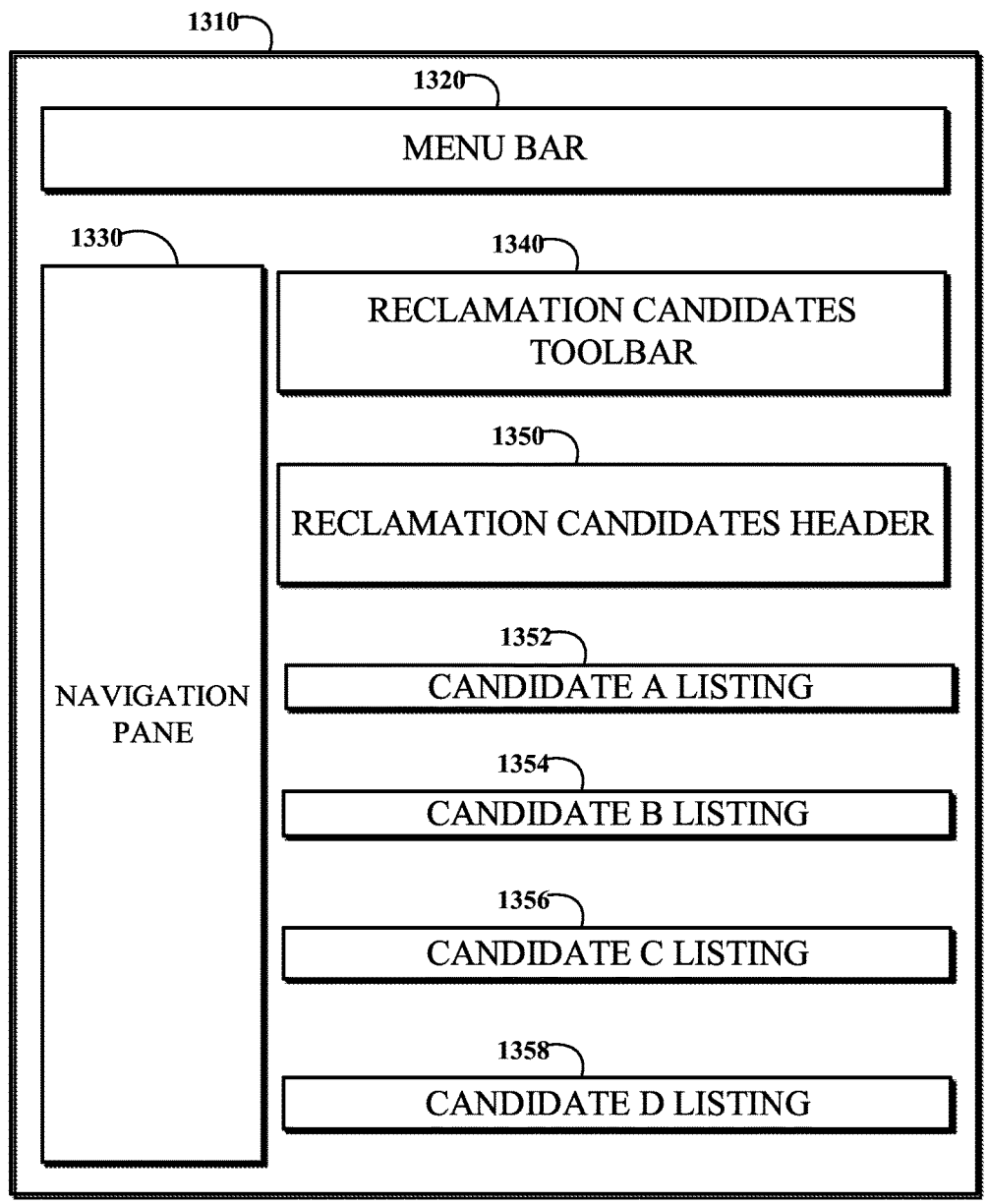
FIG. 13 is a diagram of an example display region generated for presenting information about reclamation candidates in a computing network and receiving user commands related to reclamation candidates.

FIG. 13 is a diagram of an example display region 1310 generated for presenting information about reclamation candidates in a computing network and receiving user commands related to reclamation candidates. The display region 1310 includes a menu bar 1320; a navigation pane 1330; a reclamation candidates toolbar 1340; a reclamation candidates header 1350; and reclamation candidate listings 1352, 1354, 1356, and 1358. For example, the display region 1310 may be generated by the user interface 220 of FIG. 2. For example, the display region 1310 may be generated based on data determined by software reconciliation module 340 of FIG. 3. For example, the display region 1310 may be generated based on data determined by software reconciliation process 520 of FIG. 5.

The menu bar 1320 may include a user icon reflecting the status of a currently logged in user, a search icon, a chat icon, a help icon, a setup icon, an options icon, and a proxy selection drop-down menu. The navigation pane 1330 may include a search box, a favorites icon, and a site map or tree. The reclamation candidates toolbar 1340 may include a listing configuration icon, a new candidate icon for adding a new reclamation candidate, a reclaim all icon for initiating reclamation of all candidate software components in the listings, a search box with a drop-down field/column selector, and paging icons.

The reclamation candidates header 1350 may list column headings that may include names for attributes or metadata that are displayed in the area of the display region 1310 below the reclamation candidates header 1350. The area of the display region 1310 below the reclamation candidates header 1350 may include one or more reclamation candidate listings for software components installed in a private network that have identified for potential reclamation (e.g., due to low levels of recorded or predicted software usage) to conserve resources such as memory or licensing costs. In this example, four reclamation candidate listings 1352, 1354, 1356, and 1358 are displayed below the reclamation candidates header 1350. The reclamation candidate listings 1352, 1354, 1356, and 1358 may display values of attributes of or metadata for corresponding computing resources discovered in a customer computing network. For example, an reclamation candidate listing (e.g., candidate listing A 1352, candidate listing B 1354, candidate listing C 1356 or candidate listing D 1358) may include a reclamation candidate identifier (e.g., a number); a name of a computing resource to be reclaimed; an assigned to user identifier; an assignment group (e.g., "software managers", "accounting", or "information technology"); a publisher (e.g., "Adobe Systems"®, "IBM"®, or "Microsoft"®) for the candidate; a product identifier (e.g., "Acrobat"®, "Illustrator"®, "Captivate"®, "Photoshop" "Dreamweaver"®, "Fireworks"®, "JProfiler"®, "Lotus Notes"®, "Windows Server 2012"®, or "SQL server"®) for the candidate; a state (e.g., "attention required", "ready", "awaiting user", "awaiting approval", or "awaiting revocation"); an opened date and time; a closed date and time; a potential savings (e.g., in dollars) to be realized by carrying out the reclamation; and/or a description (e.g., a string provided by a user).

Figure 14:
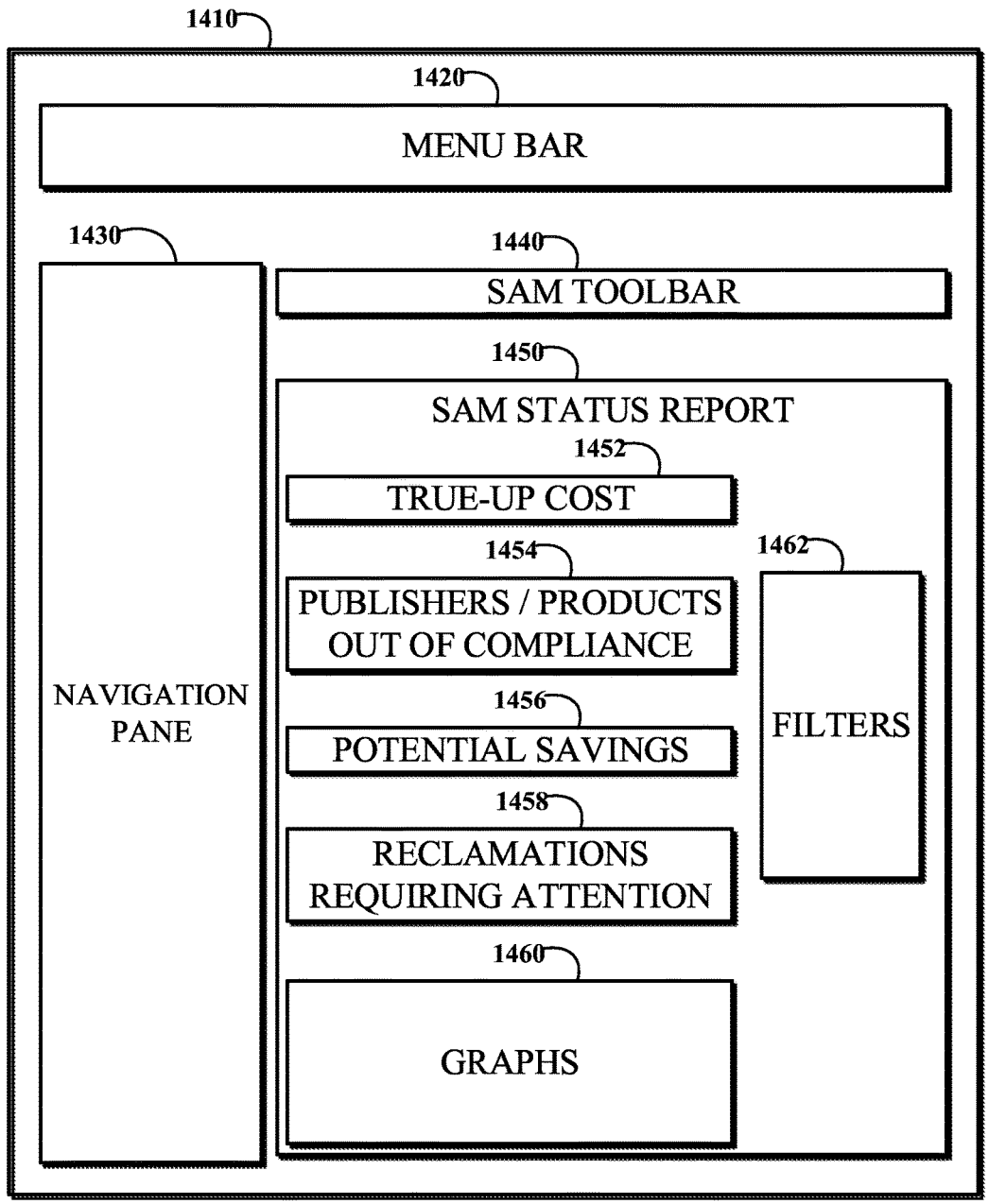
FIG. 14 is a diagram of an example display region generated for presenting information about software asset management operations for a computing network.

FIG. 14 is a diagram of an example display region 1410 generated for presenting information about software asset management operations for a computing network. The display region 1410 includes a menu bar 1420; a navigation pane 1430; a software asset management toolbar 1440; and a software asset management report 1450. For example, the display region 1410 may be generated by the user interface 220 of FIG. 2. For example, the display region 1410 may be generated based on data determined by the software reconciliation module 340 of FIG. 3. For example, the display region 1410 may be generated based on outputs 530 the software reconciliation process 520 of FIG. 5.

The menu bar 1420 may include a user icon reflecting the status of a currently logged in user, a search icon, a chat icon, a help icon, a setup icon, an options icon, and a proxy selection drop-down menu. The navigation pane 1430 may include a search box, a favorites icon, and a site map or tree. The software asset management toolbar 1440 may include a display configuration icon, an attachment icon, a settings icon, and an export icon (e.g., for exporting results of a software reconciliation process to one or more files such as a comma separated variable text file, a PDF, or a spreadsheet).

The software asset management report 1450 may include a true-up cost 1452 (e.g., in dollars) that indicates the total cost to bring all current installations and usage of software components in the computing network into compliance via procurement of additional software entitlements. The software asset management report 1450 may include a counts of publishers and products 1454 that are currently out of compliance with currently held software entitlements for the computing network. The software asset management report 1450 may include a potential savings 1456 (e.g., in dollars) that indicates the total cost savings that could result from implementing all the candidate reclamations of software components that have been identified by the software asset management system (e.g., the system 300 using the software reconciliation module 340). The software asset management report 1450 may include a count 1458 of reclamations requiring attention from a user (e.g., the assigned user of a reclamation candidate or a system administrator). The software asset management report 1450 may include a set of one or more graphs 1460 illustrating the status of software asset management operations for a computing network under management. For example, the graphs 1460 may include a bar graph of true-up costs by software product (e.g., showing the top ten software products by total true-up cost); a bar graph of potential savings by software product (e.g., showing the top ten software products by total potential savings); a pie chart of active software reclamations by state (e.g., "attention required", "ready", "awaiting user", "awaiting approval", or "awaiting revocation"); and a bar graph of active software reclamations by product (e.g., showing the top ten software products by reclamation candidate count). The graphs 1460 may also include plots showing software compliance trends over time for a computing network under management. For example, the graphs 1460 may include a plot showing a non-zero trend of values for total true-up cost (y-axis) over time (x-axis); and when a specific time on the compliance trend plot is clicked; then a pop-up displaying a count of publishers out of compliance, a count of software products out of compliance, and an over-licensed amount are displayed for that specific time clicked. In some implementations, clicking on pop-ups will cause a breakdown by publisher and/or software product for the time to be displayed for these compliance metrics. The software asset management report 1450 may include a filter 1462 with drop-down menus focus the software asset management report 1450 on a particular subset of the data (e.g., filtering by publisher, product, and/or product classification). Using the filter 1462 may cause the software asset management report 1450 to be updated to display corresponding compliance metrics and graphs for the specified subset of the data.

An implementation of this disclosure is a system for provisioning software in computing networks. The system includes a means for invoking one or more discovery probes; a means for retrieving software usage data based at least on the one or more discovery probes; a means for determining software usage predictions based on the software usage data; a means for allocating, based on the software usage predictions, per user software entitlements and per device software entitlements to obtain an allocation of software entitlements; and a means for invoking installation or uninstallation of software responsive to the allocation of software entitlements.

All or a portion of the implementations of the systems and techniques described herein can be implemented using a multi-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other multi- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory computer-readable media or non-transitory machine-readable media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system operable to provision software in computing networks, the system comprising:
    a memory; and
    a processor, wherein the memory includes instructions executable by the processor to cause the system to:
        invoke one or more discovery probes to identify software installed on one or more computing devices within the computing network;
        retrieve software usage data based at least on the one or more discovery probes;
        determine software usage predictions based on the software usage data;
        determine software entitlement metrics based on the software usage predictions, software installation models, and software entitlement data;
        allocate, based on the software usage predictions, software installation models, and the software entitlement data, per user software entitlements and per device software entitlements to obtain an allocation of software entitlements, wherein allocating per user software entitlements and per device software entitlements to obtain the allocation of software entitlements is based on the software installation models;
        update the software installation models in a configuration management database based on the one or more discovery probes;
        select software entitlements for procurement based on the software installation models and the software usage predictions;
        transmit data indicating the selected software entitlements to a client device; and
        invoke installation or uninstallation of the software responsive to the allocation of software entitlements.

2. The system of claim 1, wherein the instructions for allocating, based on the software usage predictions, per user software entitlements and per device software entitlements to obtain the allocation of software entitlements include instructions executable by the processor to cause the system to:
    allocate per user software entitlements before allocating per device software entitlements.

3. The system of claim 1, wherein the memory includes instructions executable by the processor to cause the system to:
    receive software entitlement parameters from a plurality of software vendor websites;
    compare a plurality of software entitlements based on the software entitlement parameters and the software usage predictions; and
    select a software entitlement based on the comparison of the plurality of software entitlements.

4. The system of claim 1, wherein the software usage predictions include information about cloud services from one or more external service providers, and the memory includes instructions executable by the processor to cause the system to:
    determine a recommendation to procure a reserved instance of a cloud service based on the software usage predictions.

5. A method to provision software in computing networks, the method comprising:
    invoking one or more discovery probes to identify software installed on one or more computing devices within the computing network;
    retrieving software usage data based at least on the one or more discovery probes;
    determining software usage predictions based on the software usage data;
    determining software entitlement metrics based on the software usage predictions, software installation models, and software entitlement data;
    allocating, based on the software usage predictions, software installation models, and the software entitlement data, per user software entitlements and per device software entitlements to obtain an allocation of software entitlements, wherein allocating per user software entitlements and per device software entitlements to obtain the allocation of software entitlements is based on the software installation models;
    updating the software installation models in a configuration management database based on the one or more discovery probes;
    selecting software entitlements for procurement based on the software installation models and the software usage predictions;
    transmitting data indicating the selected software entitlements to a client device; and
    invoking installation or uninstallation of the software responsive to the allocation of software entitlements.

6. The method of claim 5, wherein allocating, based on the software usage predictions, per user software entitlements and per device software entitlements to obtain the allocation of software entitlements comprises:
    allocating per user software entitlements before allocating per device software entitlements.

7. The method of claim 5, comprising:
    receiving software entitlement parameters from a plurality of software vendor websites;

comparing a plurality of software entitlements based on the software entitlement parameters and the software usage predictions; and selecting a software entitlement based on the comparison of the plurality of software entitlements.

8. The method of claim 5, wherein the software usage predictions include information about cloud services from one or more external service providers, and further comprising:

determining a recommendation to procure a reserved instance of a cloud service based on the software usage predictions.

9. A non-transitory machine readable medium, comprising executable instructions that, when executed by a processor, cause the processor to:

invoke one or more discovery probes to identify software installed on one or more computing devices within the computing network;

retrieve software usage data based at least on the one or more discovery probes;

determine software usage predictions based on the software usage data;

determine software entitlement metrics based on the software usage predictions, software installation models, and software entitlement data;

allocate, based on the software usage predictions, software installation models, and the software entitlement data, per user software entitlements and per device software entitlements to obtaining an allocation of software entitlements, wherein allocating per user software entitlements and per device software entitlements to obtain the allocation of software entitlements is based on the software installation models;

update the software installation models in a configuration management database based on the one or more discovery probes;

select software entitlements for procurement based on the software installation models and the software usage predictions;

transmit data indicating the selected software entitlements to a client device; and invoking installation or uninstallation of the software responsive to the allocation of software entitlements.

10. The non-transitory machine readable medium of claim 9, wherein the instructions for allocating, based on the software usage predictions, per user software entitlements and per device software entitlements to obtain the allocation of software entitlements include executable instructions to:

allocate per user software entitlements before allocating per device software entitlements.

11. The non-transitory machine readable medium of claim 9, wherein the instructions comprise:

receiving software entitlement parameters from a plurality of software vendor websites;

comparing a plurality of software entitlements based on the software entitlement parameters and the software usage predictions; and selecting a software entitlement based on the comparison of the plurality of software entitlements.

* * * * *